(12) United States Patent
Honda

(10) Patent No.: US 9,954,741 B2
(45) Date of Patent: Apr. 24, 2018

(54) INFORMATION PROCESSING APPARATUS AND METHOD INCLUDING DISPLAY CONTROL OF MESSAGES DURING PRINTING

(71) Applicant: CANON KABUSHIKI KAISHA, Tokyo (JP)

(72) Inventor: Hideki Honda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 370 days.

(21) Appl. No.: 14/221,736

(22) Filed: Mar. 21, 2014

(65) Prior Publication Data

US 2014/0289635 A1 Sep. 25, 2014

(30) Foreign Application Priority Data

Mar. 22, 2013 (JP) .................. 2013-060271

(51) Int. Cl.
| | |
|---|---|
| *G06F 3/048* | (2013.01) |
| *G06F 3/00* | (2006.01) |
| *G06F 9/00* | (2006.01) |
| *H04L 12/24* | (2006.01) |
| *G06F 9/44* | (2006.01) |
| *H04N 1/00* | (2006.01) |
| *G06F 3/12* | (2006.01) |

(52) U.S. Cl.
CPC ............ *H04L 41/22* (2013.01); *G06F 3/1204* (2013.01); *G06F 3/1256* (2013.01); *G06F 3/1292* (2013.01); *G06F 9/4443* (2013.01); *H04N 1/00238* (2013.01); *H04N 1/00411* (2013.01); *H04N 1/00501* (2013.01); *H04N 1/00474* (2013.01); *H04N 1/00482* (2013.01)

(58) Field of Classification Search
CPC ........ G06F 3/1253; G06F 3/038; G06F 3/048; G06F 3/00; G06F 9/00; G09G 5/14
USPC .......................... 715/740, 705, 809, 737, 771
See application file for complete search history.

(56) References Cited

U.S. PATENT DOCUMENTS

| | | | |
|---|---|---|---|
| 7,249,326 B2 * | 7/2007 | Stoakley | G06F 3/04817 715/772 |
| 2008/0266255 A1 * | 10/2008 | Lawson | G06F 3/038 345/163 |

(Continued)

FOREIGN PATENT DOCUMENTS

| | | | |
|---|---|---|---|
| JP | 2003080766 A | 3/2003 | |
| JP | 2006092302 A | 4/2006 | |

(Continued)

*Primary Examiner* — Hugo Molina
(74) *Attorney, Agent, or Firm* — Canon USA, Inc. I.P. Division

(57) ABSTRACT

An information processing apparatus capable of providing a first user interface (UI) environment and a second UI environment includes a determination unit configured to determine a UI environment that displays a message screen, and a control unit configured to, in a case where a message screen is required to be displayed to a user when a processing request is made to a peripheral device via an application, control a request for displaying the message screen, wherein a message screen adapted for the UI environment determined by the determination unit is displayed according to the request controlled by the control unit after the processing request is input via the application.

6 Claims, 22 Drawing Sheets

(56) References Cited

U.S. PATENT DOCUMENTS

| | | | |
|---|---|---|---|
| 2011/0102836 A1* | 5/2011 | Kawaura | G06F 3/1204 358/1.15 |
| 2012/0200881 A1* | 8/2012 | Yamato | G06K 15/1809 358/1.15 |
| 2012/0311493 A1* | 12/2012 | Sohn | H04M 1/72547 715/808 |
| 2013/0016121 A1* | 1/2013 | Azuchi | G06F 3/04883 345/619 |
| 2013/0019183 A1* | 1/2013 | Reeves | G06F 9/4443 715/745 |
| 2013/0024778 A1* | 1/2013 | Reeves | G06F 9/4443 715/744 |
| 2013/0198367 A1* | 8/2013 | Abraham | G06F 9/4856 709/224 |
| 2014/0029049 A1* | 1/2014 | Takahashi | H04N 1/00973 358/1.15 |

FOREIGN PATENT DOCUMENTS

| | | |
|---|---|---|
| JP | 2006163954 A | 6/2006 |
| JP | 2008-262538 A | 10/2008 |
| JP | 2008-305142 A | 12/2008 |
| JP | 2009271254 A | 11/2009 |
| JP | 2012164128 A | 8/2012 |
| JP | 2014041526 A | 3/2014 |

* cited by examiner

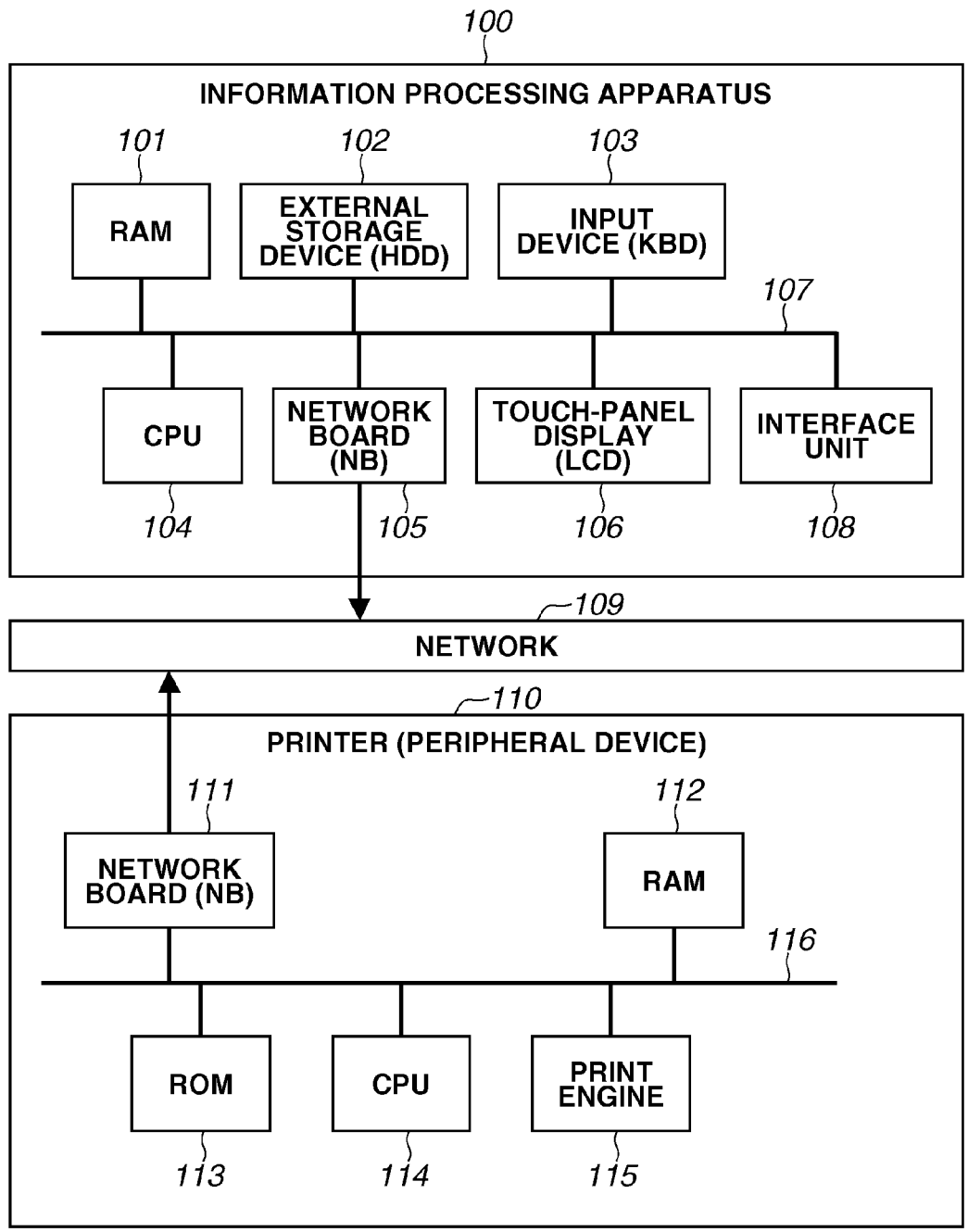

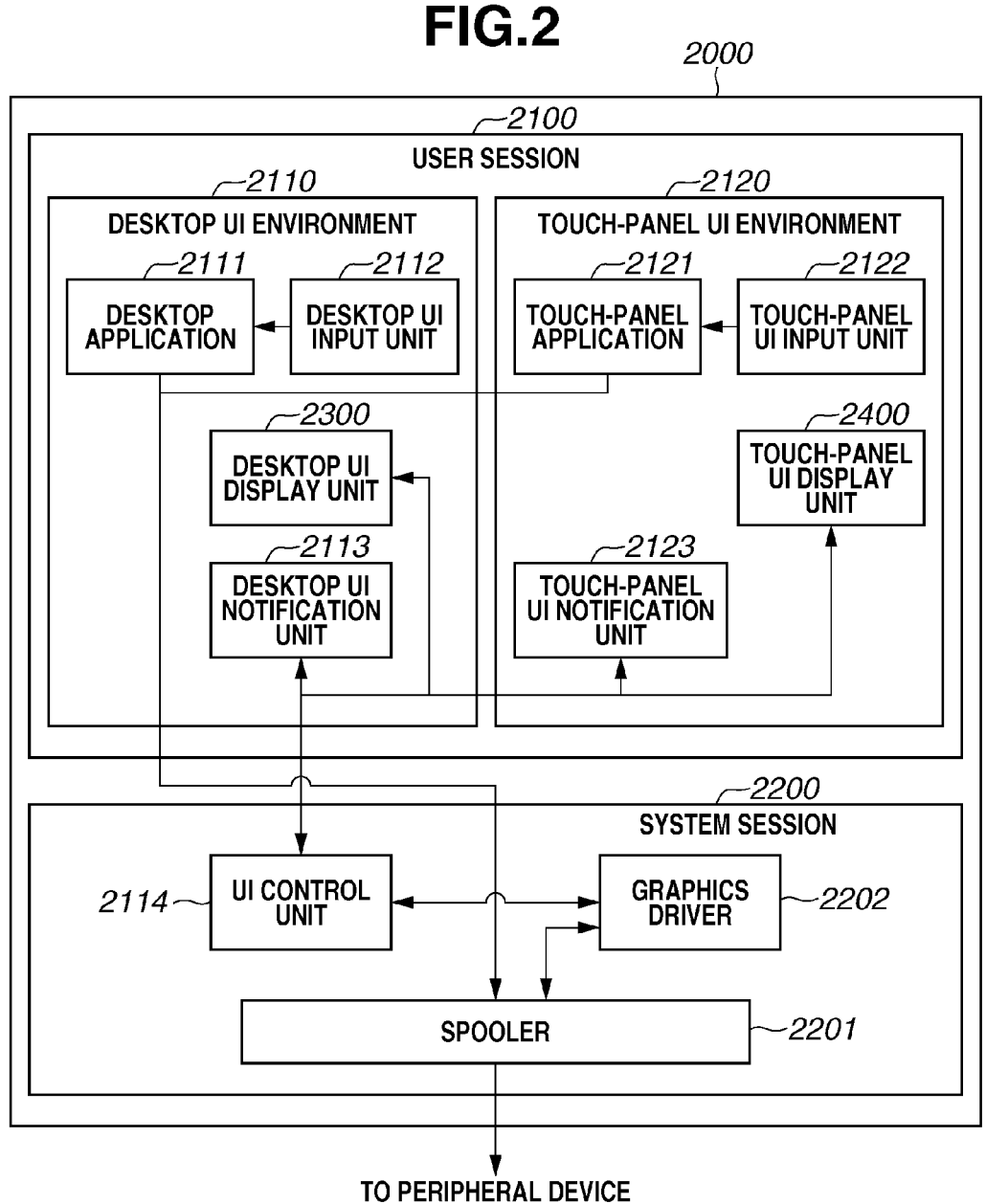

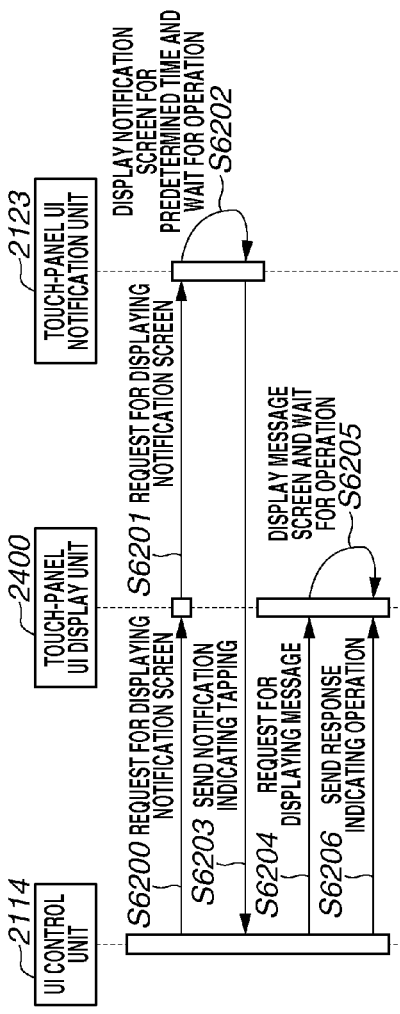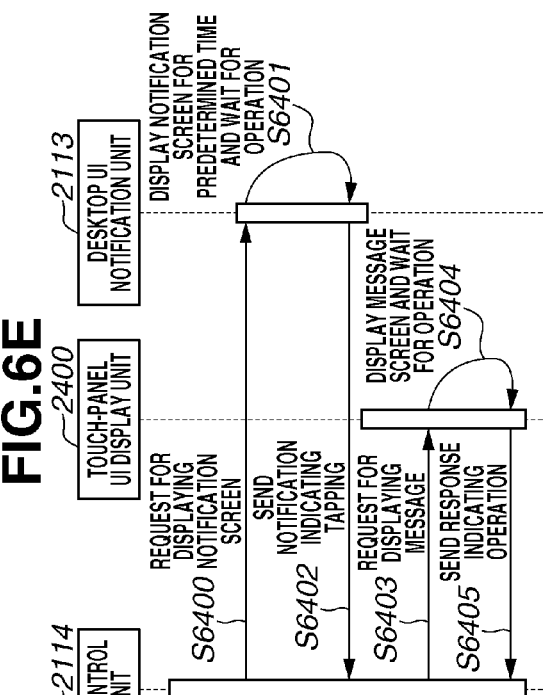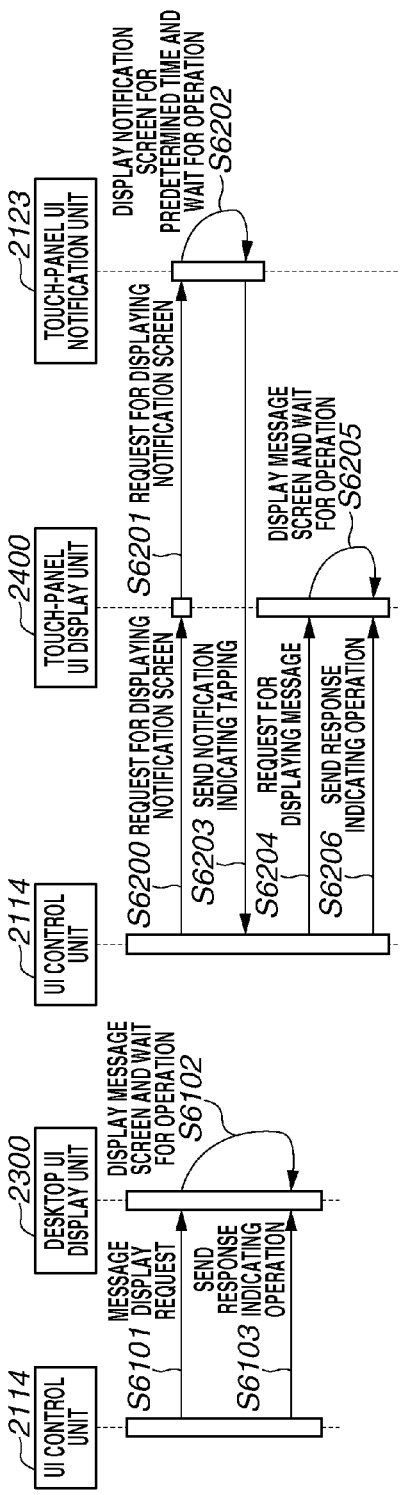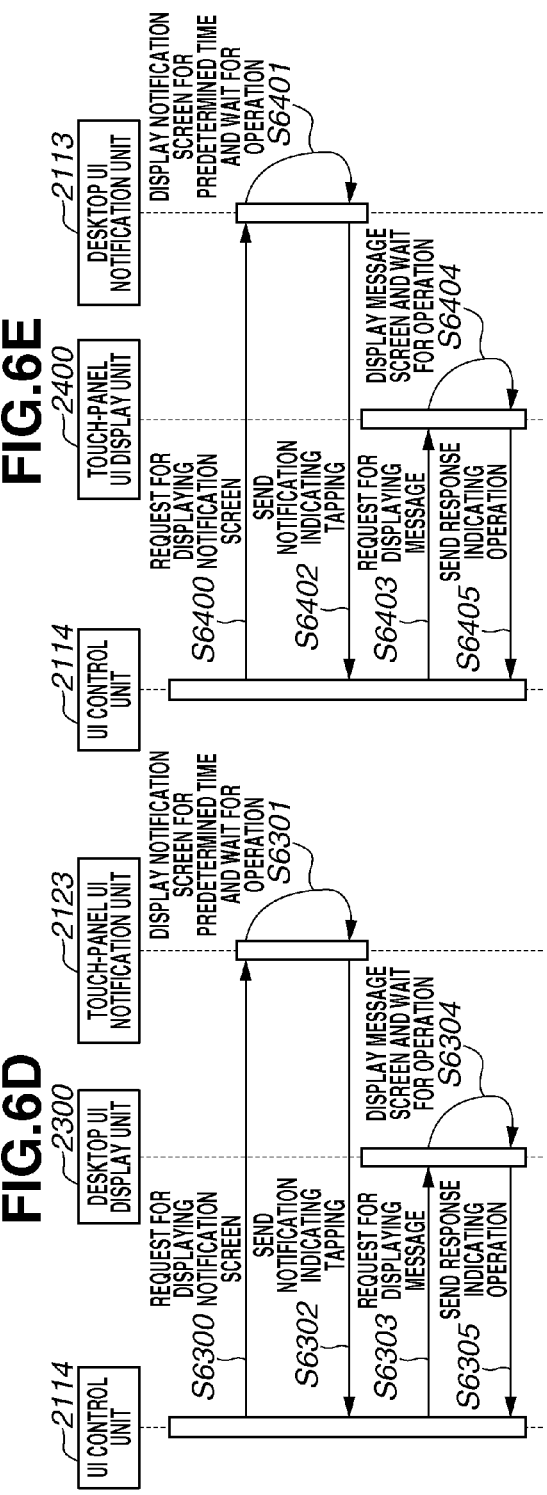

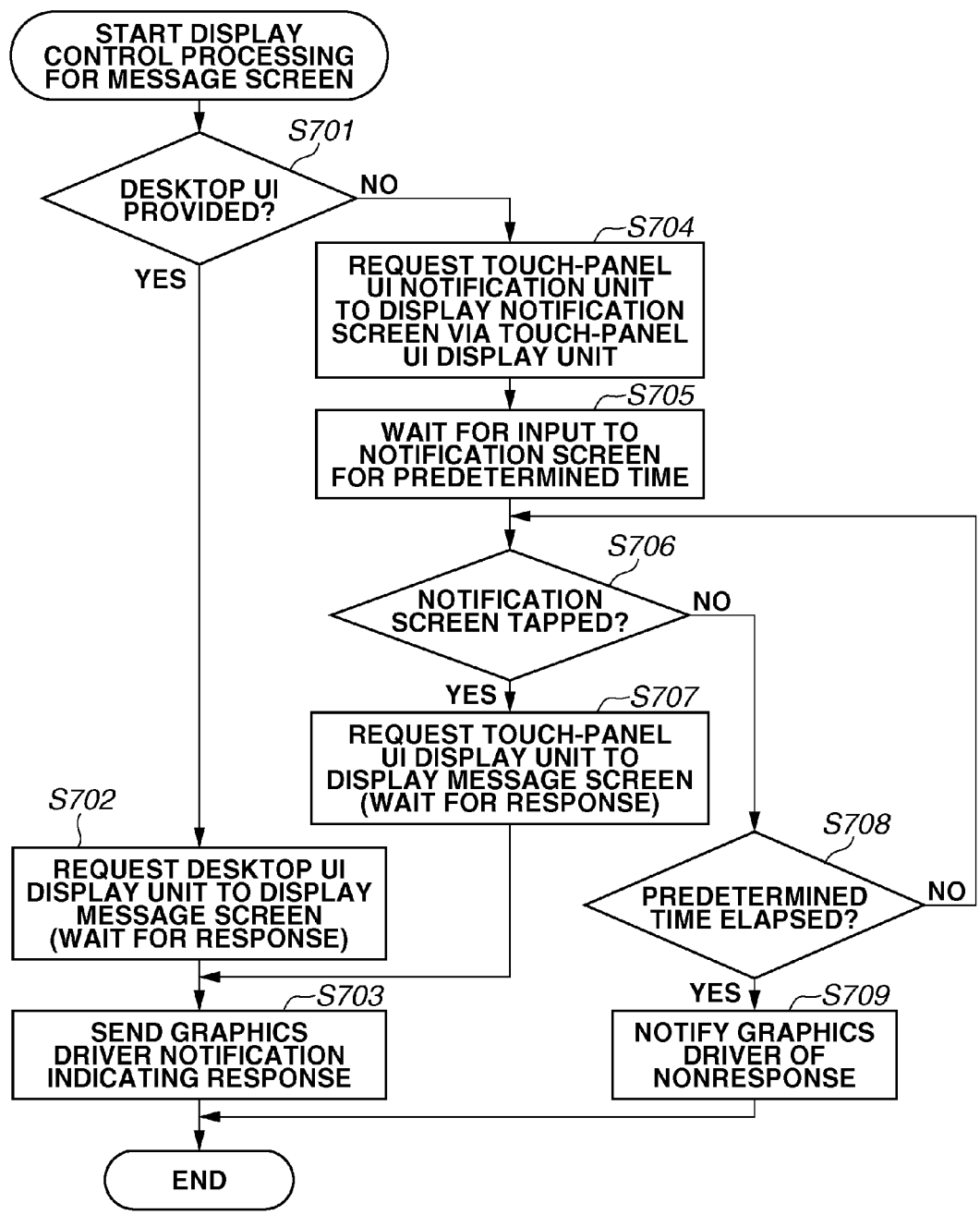

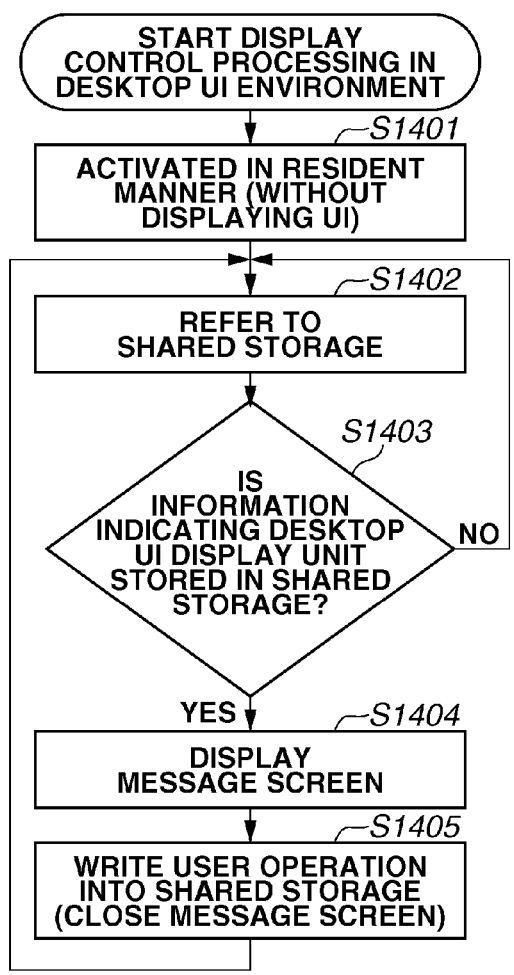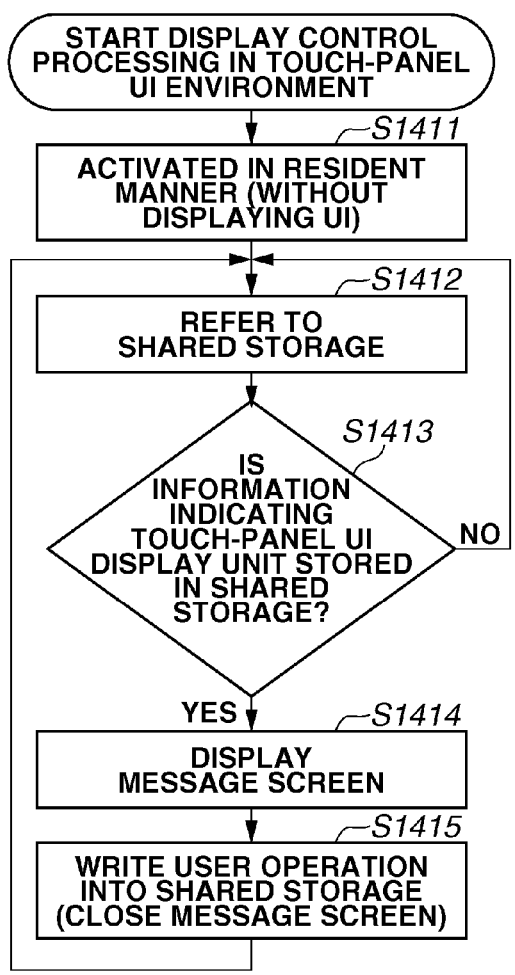

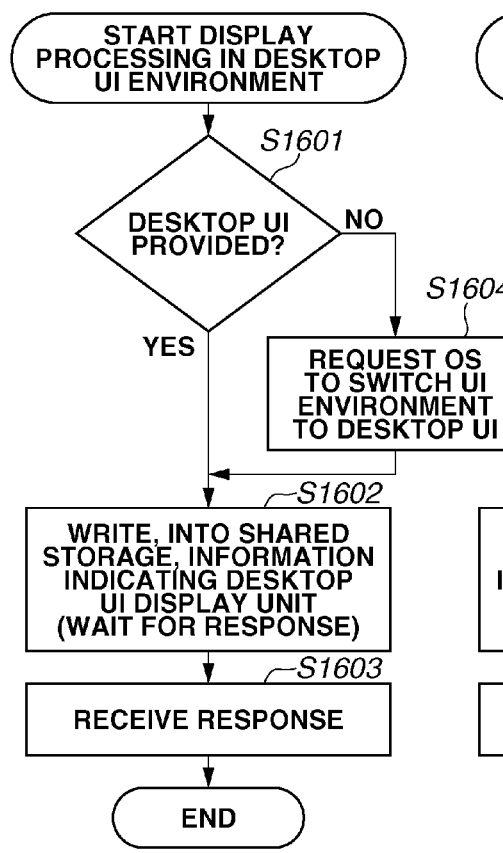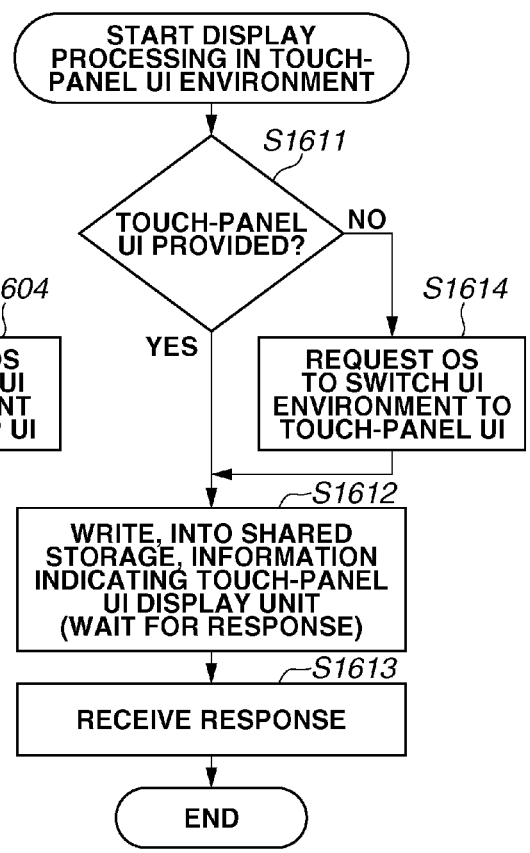

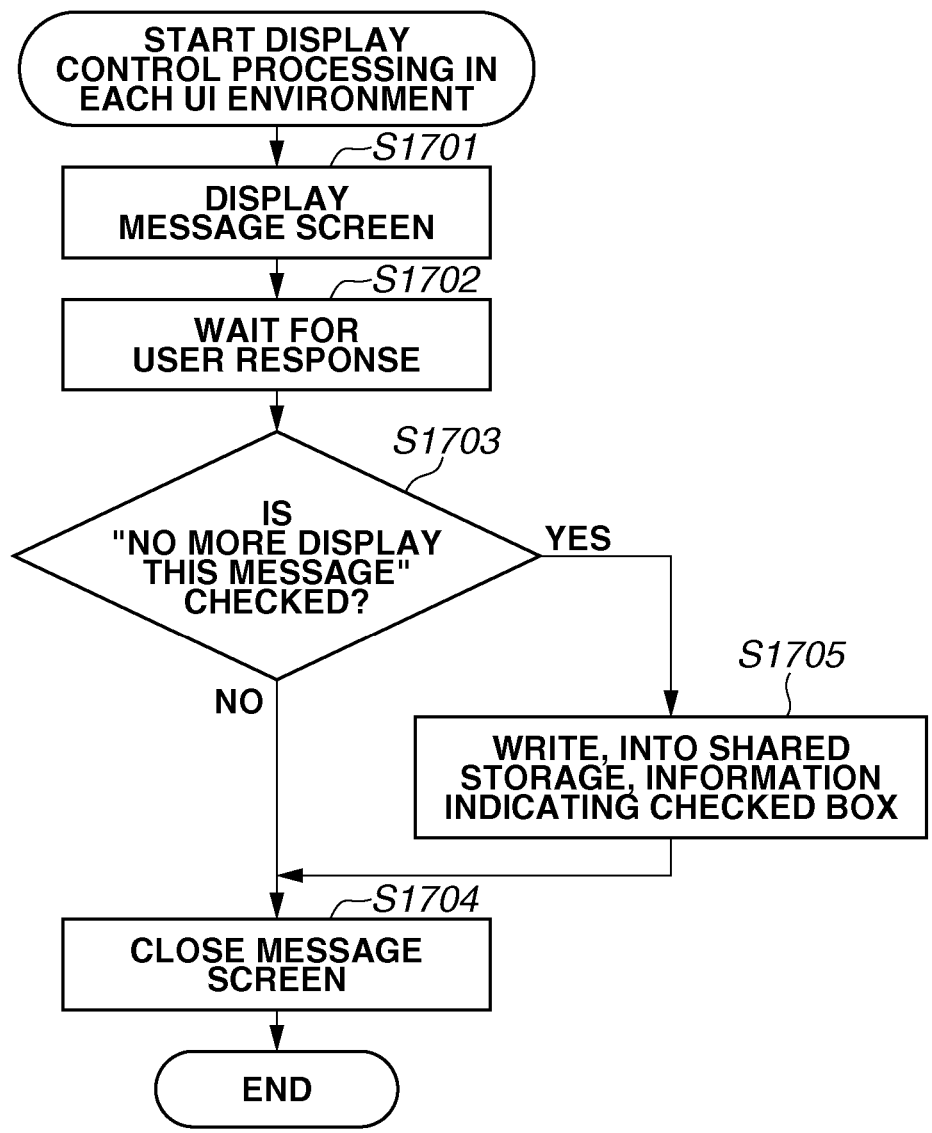

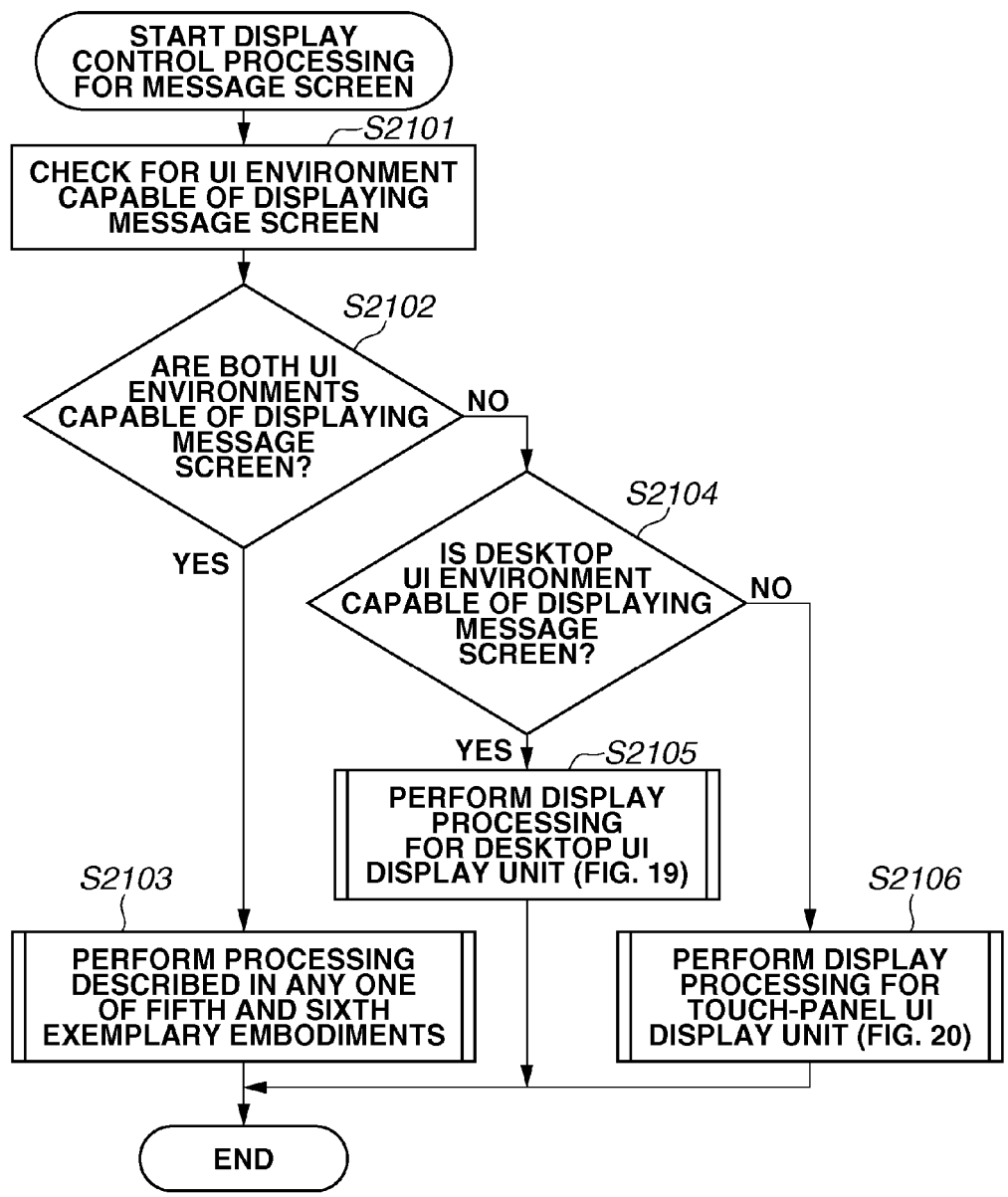

INFORMATION PROCESSING APPARATUS AND METHOD INCLUDING DISPLAY CONTROL OF MESSAGES DURING PRINTING

BACKGROUND OF THE INVENTION

Field of the Invention

The present invention relates to a technique for display control of messages during printing.

Description of the Related Art

There has been known a technique of displaying, to users, a guide appropriate for printing at the start thereof.

For example, Japanese Patent Application Laid-Open No. 2008-305142 discusses a language monitor included in a printer driver. The language monitor analyzes content of print data at the start of printing, and when determining the necessity of displaying a guide to a user, displays a guide message via a status monitor. The guide message includes, for example, a message for guiding a direction to set an envelope onto a printer during printing on the envelope.

The current operating systems (OSs) include an OS capable of providing two user interface (UI) environments different in operability. Under such an OS capable of providing a plurality of UI environments, users, when utilizing a peripheral device such as a printer, can use a desired application (application program) that runs on any one of the environments. As a result of such a usage, according to the technique discussed in Japanese Patent Application Laid-Open No. 2008-305142, there is a possibility that a guide message that is to be displayed during printing is provided to a UI environment the user does not intend to use. Thus, user operability may deteriorate.

In addition, some users who are skilled in operation may not require guide messages. Therefore, it is desirable that flexible display control, for example, setting for non-display of guide messages, can be performed. In such a case, under an OS capable of providing a plurality of UI environments, it is necessary to implement a method of managing settings such that similar display control can be performed in any UI environment.

SUMMARY OF THE INVENTION

The present invention is directed to a scheme that is excellent in operability with respect to display control of messages usable for a peripheral device even under an OS capable of providing a plurality of UI environments.

According to an aspect of the present invention, an information processing apparatus capable of providing a first user interface (UI) environment and a second UI environment that is different from the first UI environment includes a determination unit configured to determine a UI environment that displays a message screen, and a control unit configured to, in a case where a message screen is required to be displayed to a user when a processing request is made to a peripheral device via an application, control a request for displaying the message screen, wherein a message screen adapted for the UI environment determined by the determination unit is displayed according to the request controlled by the control unit after the processing request is input via the application, and wherein the message screen includes a message screen containing content associated with a predetermined operation required for the peripheral device.

Further features of the present invention will become apparent from the following description of exemplary embodiments with reference to the attached drawings.

BRIEF DESCRIPTION OF THE DRAWINGS

FIG. 1 illustrates an example of a hardware configuration of each of an information processing apparatus and a peripheral device, which are connected to a network.

FIG. 2 illustrates an example of a module configuration of software of the information processing apparatus.

FIGS. 6A, 6B, 6C, 6D, and 6E illustrate sequences of processing by various modules according to an exemplary embodiment of the present invention.

FIG. 7 is a flowchart illustrating processing performed to display a message screen according to a first exemplary embodiment.

FIGS. 14A and 14B are flowcharts illustrating processing for display control performed in the respective UI environments according to the fourth exemplary embodiment.

FIGS. 16A and 16B are flowcharts illustrating processing for display control performed in the respective UI environments according to the fourth exemplary embodiment.

FIG. 17 is a flowchart illustrating processing performed when a display unit in each UI environment receives a request for displaying a message screen according to a fifth exemplary embodiment.

FIG. 21 is a flowchart illustrating processing performed to display a message screen according to a seventh exemplary embodiment.

DESCRIPTION OF THE EMBODIMENTS

Figure 3A:
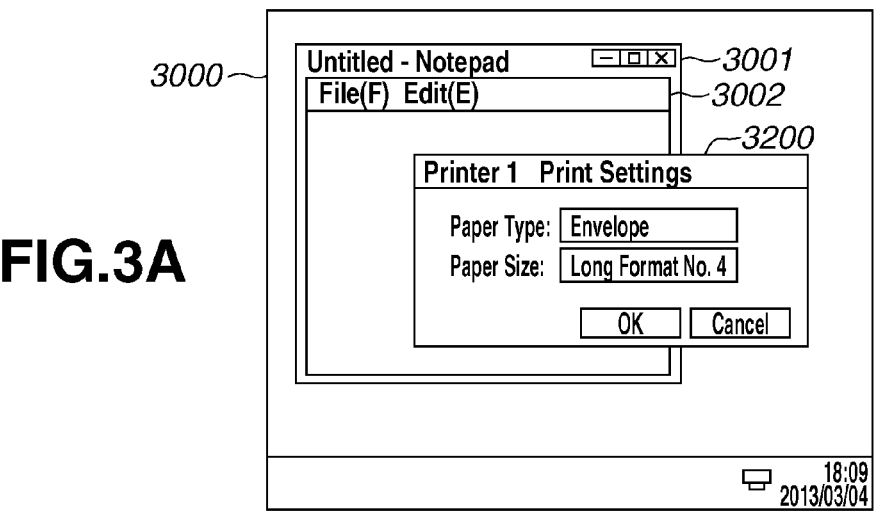
FIGS. 3A, 3B, and 3C illustrate specific examples of screens in a desktop UI environment.

Various exemplary embodiments, features, and aspects of the invention will be described in detail below with reference to the drawings. The present invention can be implemented by combining various exemplary embodiments, features, and aspects thereof as appropriate.

In addition, in the following description, an operation by a user for giving an instruction to perform printing via a printing dialog provided by an application included in an information processing apparatus may be referred to as a printing instruction.

FIG. 1 illustrates an example of a hardware configuration of each of an information processing apparatus and a peripheral device, which are included in a system according to a first exemplary embodiment of the present invention.

Referring to FIG. 1, an information processing apparatus 100 can be, for example, a general personal computer (PC). The information processing apparatus 100 includes a random access memory (RAM) 101, an external storage device (HDD) 102, an input device (KBD) 103, such as a mouse and a keyboard, a central processing unit (CPU) 104, a network board (NB) 105, a touch-panel (touchscreen) display (LCD) 106, an interface unit 108, and a bus 107, which connects the above-mentioned elements.

The RAM 101 is used as a work memory by various programs stored in the external storage device 102. The external storage device 102 stores a group of application programs, an operating system (OS), device drivers such as a printer driver, and various items of data. The input device 103 is used to input data or to give an instruction for operation. The touch-panel display 106 is used for displaying of data, notification of statuses, and input to a screen for the information processing apparatus or a printer connected thereto. In the present exemplary embodiment, the touch-panel display 106 is a display device that the user can control by touching the screen, but a display device that is incompatible with a touch operation may be used to implement processing according to the present exemplary embodiment. The network board 105 is connected to a network 109 to perform network communication. The communication pathway can be not only a wired or wireless network but also a universal serial bus (USB) or infrared communication, which is used by the interface unit 108. The CPU 104 receives a mouse cursor operation of a graphical user interface (GUI) displayed on the touch-panel display 106, a key input from the keyboard, or a touch input from the touch-panel display 106 to open a window of a program stored in the external storage device 102 and to execute various data processing operations. Thus, the user, when performing printing, can open a window associated with print settings to configure the printer 110 or to set a print processing method on a printer driver, including selection of print modes. In addition, the CPU 104 executes processing based on the programs stored in the external storage device 102 to implement a software configuration of the information processing apparatus 100, as illustrated in FIG. 2, and processing operations of steps illustrated in the flowcharts to be described below.

The printer 110, which is an example of a peripheral device, includes a network board (NB) 111, a RAM 112, a ROM 113, a CPU 114, and a print engine 115. The printer 110 further includes a bus 116, which connects the above-mentioned elements to one another. The network board 111 is connected to the network 109. The ROM 113 stores control programs. The CPU 114 controls the printer 110 according to the programs stored in the ROM 113. The RAM 112 is used as a work memory for the CPU 114, and is also used as a receive buffer to temporarily store received data. The print engine 115 operates to print data stored in the RAM 112.

In the present exemplary embodiment, a device driver is used as an example of a program that provides a dialog or the like to the user. However, besides the device driver, an application or the like that is designed to control a peripheral device compliant with an OS and that runs similarly to the device driver can also be used. In the present exemplary embodiment, such a device driver or an application similar thereto may be sometimes referred to as control software for controlling a peripheral device.

Besides a printing apparatus, the peripheral device may be a facsimile apparatus or a scanner apparatus. In such a case, a facsimile driver or a scanner driver can be installed as a device driver. Even in a case where the facsimile driver or scanner driver is used to issue a processing request to a corresponding device, display control of a screen for various settings or an as-needed guide message can be performed in a manner similar to the printer driver.

FIG. 2 illustrates an example of a configuration of software modules corresponding to the functions of an OS 2000, which operates on the information processing apparatus 100. The modules illustrated in FIG. 2 are stored as programs in the external storage device 102, loaded onto the RAM 101 as appropriate, and executed by the CPU 104 in the information processing apparatus 100 to implement the functions thereof.

The concept "session" is introduced into the OS 2000 to support log-in of a plurality of users. A session is the concept of a connection status for a screen, a keyboard, or a process space prepared for each user.

The session includes two types. One type is a user session 2100, which is assigned to each user, and the other type is a system session 2200, which is a special session assigned to operations of the OS 2000. In general, in consideration of security, the user session 2100 and the system session 2200 are separated from each other. Information on each user who has logged in is managed with the user session 2100. The user session 2100 is generated for each user when the user has logged into the system, and terminates when the user has logged out.

When the user session 2100 is started, a plurality of user interface (UI) environments are generated. In the present exemplary embodiment, as an example, a desktop UI environment 2110, which is adapted for a mouse operation, and a touch-panel UI environment 2120, which is adapted for a touch-panel operation as compared with the desktop UI environment 2110, are described. The desktop UI environment 2110 is provided by a desktop UI environment platform and the touch-panel UI environment 2120 is provided by a touch-panel UI environment platform. One of the two UI environments is exclusively displayed at a time on the touch-panel display 106, while both the two UI environments are not simultaneously displayed. In each UI environment, applications of a computer architecture specialized for that environment are supposed to operate. Therefore, a desktop application prepared for the desktop UI environment 2110 does not sufficiently operate under the touch-panel UI environment 2120. Also, a touch-pane application prepared for the touch-panel UI environment 2120 does not sufficiently operate under the desktop UI environment 2110. Accordingly, if the user wants to use an application for a UI environment different from the currently-displayed UI environment, the user needs to switch the UI environment for operation.

Under the desktop UI environment 2110, various desktop applications 2111, such as a document preparation application and a web browser, can run. The desktop UI environment 2110 includes a desktop UI input unit 2112 for configuring a peripheral device, such as the printer 110. The desktop UI environment 2110 further includes a desktop UI display unit 2300 for displaying information to the user usable to issue a processing request to the peripheral device. The desktop UI environment 2110 further includes a desktop UI notification unit 2113 for providing a notification screen to the desktop UI environment 2110.

Under the touch-panel UI environment 2120, various touch-panel applications 2121, such as mailing software and a web browser, can run. The touch-panel UI environment 2120 includes a touch-panel UI input unit 2122 for configuring a peripheral device, such as the printer 110. The touch-panel UI environment 2120 further includes a touch-panel UI display unit 2400 for displaying information to the user usable to issue a processing request to the peripheral device. The touch-panel UI environment 2120 further includes a touch-panel UI notification unit 2123 for providing a notification screen to the touch-panel UI environment 2120.

The system session 2200 is a session for a user-independent system. The system session 2200 is generated at the time of start-up of the OS 2000, and terminates when the OS 2000 terminates. In the system session 2200, a service that acts as a foundation of a system independent of login users operates. For example, a spooler 2201 operates as a printing-related service. The spooler 2201 receives rendering data and print setting information from the desktop application 2111 or the touch-panel application 2121. A graphics driver 2202, which is compatible with the printer 110 serving as an output destination, generates print data based on the rendering data and print setting information. Then, the spooler 2201 transmits the generated print data to the printer 110 via the network 109, so that the printer 110 performs printing. In addition, a UI control unit 2114 operates to control on which UI environment a display screen to be indicated to the user is to be displayed when a processing request is made to the peripheral device.

The graphics driver 2202, the desktop UI input unit 2112, and the desktop UI display unit 2300 are provided, as a printer driver, by a hardware vendor that developed the printer 110. In other words, control software including a data generation unit that generates data usable for a peripheral device, which corresponds to a graphics driver, a desktop UI input unit, and a desktop UI display unit is provided by a vendor that developed a peripheral device compatible with the control software.

The touch-panel UI input unit 2122 and the touch-panel UI display unit 2400 are provided, as an application that provides a function for displaying a setting UI and a message screen to the user compatible with the control software in the touch-panel UI environment, by a hardware vendor that developed the peripheral device.

The touch-panel UI input unit 2122 and the touch-panel UI display unit 2400 are a type of application that runs under the touch-panel UI environment 2120 and are thus provided as a single application. A group of applications that run under the touch-panel UI environment 2120 is managed on an external service prepared for the OS 2000 to enhance security and increase quality. Applications that run under the touch-panel UI environment 2120 are distributed from an external service via the network 109 to be provided to the information processing apparatus 100. The touch-panel UI input unit 2122 and the touch-panel UI display unit 2400 are automatically installed on the information processing apparatus 100 in conjunction with the installation of a device driver, such as a printer driver, and are thus set into the system.

Figure 3B:
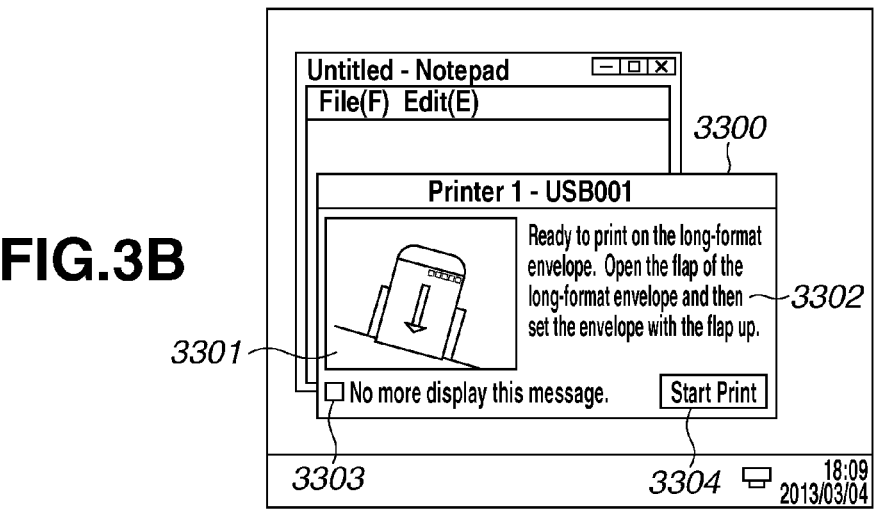
Figure 3C:
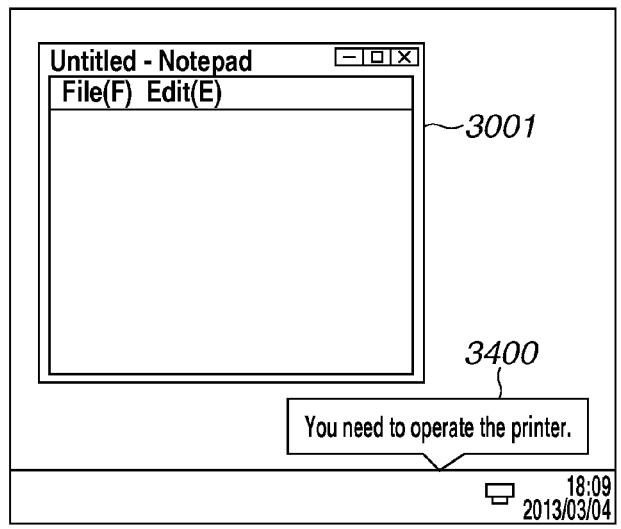

FIGS. 3A, 3B, and 3C illustrate specific examples of screens in the desktop UI environment 2110, which are displayed on the touch-panel display 106.

FIG. 3A illustrates an example in which the desktop application 2111 is displayed on the desktop UI environment 2110. In the desktop UI environment 2110, a display space called a desktop UI 3000 is displayed on the entire screen of the touch-panel display 106. The desktop application 2111 is displayed within an area specified therefor, which is indicated with a window 3001. A plurality of operation screens that one or more desktop applications provide is individually displayed as the window 3001. Thus, a plurality of windows 3001 that a plurality of desktop applications 2111 provides can be displayed on the desktop UI 3000. In the example illustrated in FIG. 3A, a menu 3002 for application operation is displayed on the window 3001. The desktop application 2111 operates in response to the reception of an input from the touch-panel display 106 or the input device 103. When printing is to be performed via the desktop application 2111, the user selects "printing" (not illustrated) from the menu 3002. Then, the user appropriately operates a printing-related dialog (not illustrated) displayed on the desktop UI 3000, so that a print setting UI 3200 for the desktop UI input unit 2112 is displayed. The desktop UI input unit 2112 is a module that performs print setting processing associated with the printer 110. The print setting UI 3200 has a plurality of setting items associated with printing, such as paper type and paper size.

FIG. 3B illustrates a message screen 3300 for the desktop UI environment 2110. The message screen 3300 can be referred to as a confirmation screen that is displayed before a process is actually executed by the peripheral device after a request for executing the process is made (an OK button is pressed or operated by the user) via a setting dialog (not illustrated) provided by the desktop application 2111.

In the example illustrated in FIG. 3B, the message screen 3300 contains a bitmap image 3301 and a message 3302, which are displayed to make an operation content for the user during setting of envelope printing readily understandable by the user. The message screen 3300 further contains a checkbox 3303, which is usable to select whether to re-display the message screen 3300 for future printing, and a print start button 3304. When the print start button 3304 is pressed or operated, the message screen 3300 is closed, and then printing starts according to the content set via the print setting UI 3200.

FIG. 3C illustrates a notification screen 3400 for the desktop UI environment 2110. The notification screen 3400, which can be called a balloon, is displayed on the desktop UI 3000 by the desktop UI notification unit 2113. The notification screen 3400 is displayed on the desktop UI 3000 for a predetermined time. An operation performed when the notification screen 3400 is tapped or clicked by the user within the predetermined time is described below.

FIGS. 4A, 4B, 4C, and 4D illustrate specific examples of screens in the touch-panel UI environment 2120 displayed on the touch-panel display 106.

The touch-panel UI environment 2120 is designed for a UI to give priority to operations on the touch-panel display 106. Operation menu items are displayed as large buttons as compared with the buttons provided by the desktop UI environment 2110, to enable an easy touch operation with a finger or pen. While the touch-panel UI environment 2120 can receive inputs from the input device 103, such as a mouse and a keyboard, the following description is made with operations on the touch-panel display 106. As illustrated in FIG. 2, the touch-panel application 2121 runs under the touch-panel UI environment 2120.

Figure 4A:
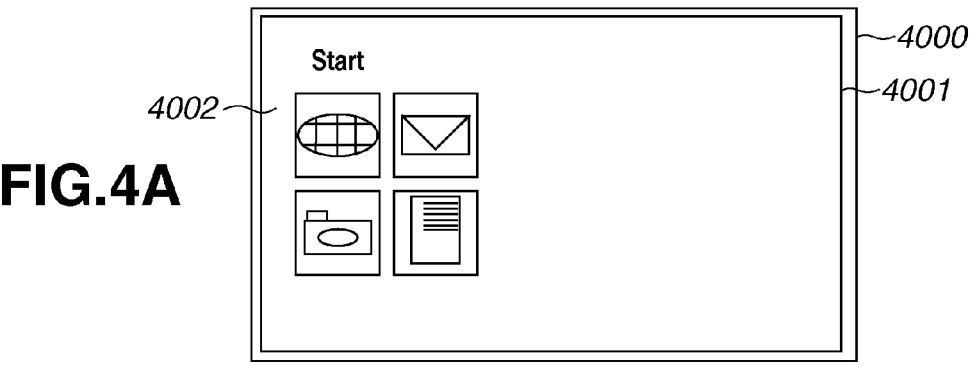
FIGS. 4A, 4B, 4C, and 4D illustrate specific examples of screens in a touch-panel UI environment.

FIG. 4A illustrates a start screen 4001 in the touch-panel UI environment 2120. The start screen 4001 is displayed on the entire screen of a touch-panel UI 4000. On the start screen 4001, the touch-panel application 2121 is displayed in the form of a tile 4002. When the user taps the tile 4002, the touch-panel application 2121, which corresponds to the tile 4002, is displayed on the entire screen of the touch-panel UI 4000.

Figure 4B:
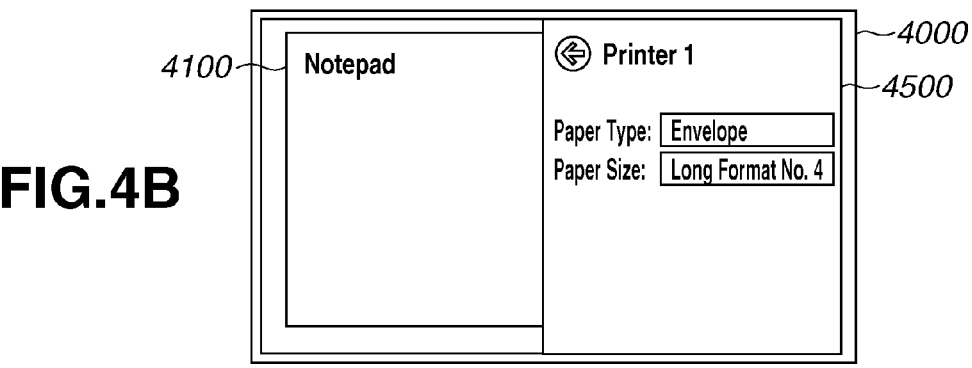

FIG. 4B illustrates an example of display of a notepad 4100, which is an example of the touch-panel application 2121. The notepad 4100 is displayed on the entire screen of the touch-panel UI 4000, so that the other applications are not displayed. In a case where, for example, printing is performed with the touch-panel application 2121, a touch operation on the touch-panel display 106 causes a print setting UI 4500 of the touch-panel UI input unit 2122 to be displayed on the touch-panel UI 4000. The touch-panel UI input unit 2122 is a module for processing print settings for the printer 110. The print setting UI 4500 contains printing-related setting items, such as paper type and paper size.

Figure 4C:
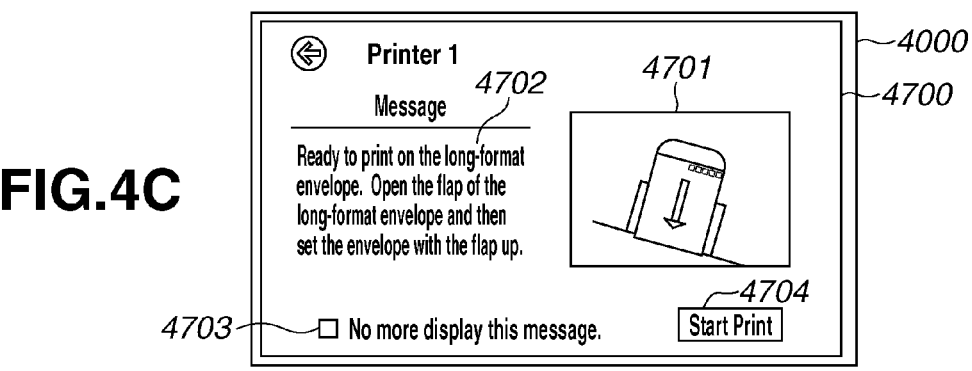

FIG. 4C illustrates a message screen 4700 for the touch-panel UI environment 2120, which is displayed when a processing request is made to the peripheral device. The message screen 4700 contains a bitmap image 4701 and a message 4702, which are displayed to make an operation content for the user, for example, during setting of envelope printing readily understandable by the user. The message screen 4700 further contains a checkbox 4703, which is usable to select whether to re-display the message screen 4700 for future printing, and a print start button 4704. When the print start button 4704 is tapped as a user's input operation, the message screen 4700 is closed, and then printing starts according to the content set via the print setting UI 4500.

Figure 4D:
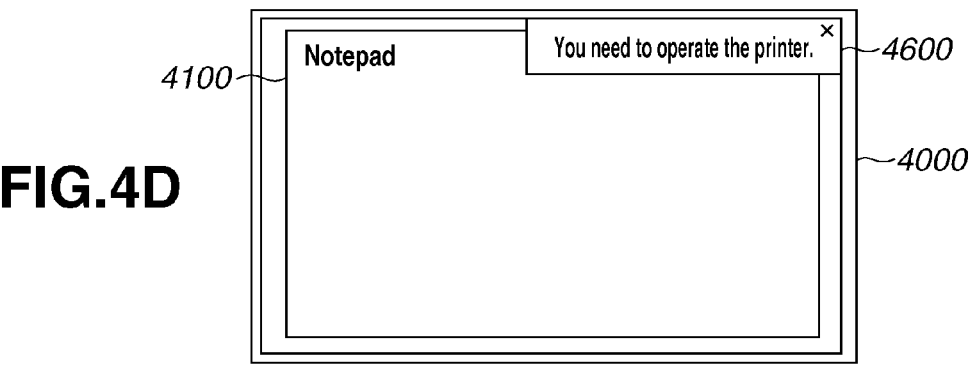

FIG. 4D illustrates a notification screen 4600 for the touch-panel UI environment 2120. The notification screen 4600, which can be called a toast, is displayed on the touch-panel UI 4000 by the touch-panel UI notification unit 2123. The notification screen 4600 is displayed on the touch-panel UI 4000 along with a given message for a predetermined time to enable the reception of a tap operation by the user. An operation performed when the notification screen 4600 is tapped by the user within the predetermined time is described below.

With reference to FIGS. 6A, 6B, 6C, 6D, and 6E, print processing is described in a case where the settings for displaying a guide to a user at the start of printing, as in the case of envelope printing, are configured via the print setting UI 3200 or the print setting UI 4500. The first exemplary embodiment is described with envelope printing taken as an example. However, the present exemplary embodiment is not limited to the settings for envelope printing, but is also applicable to the settings requiring the user to do a special operation on the peripheral device, for example, the settings for displaying a guide explaining the method of setting a compact disc recordable (CD-R) to a printer in the case of printing on the disc surface. The settings requiring the user to do a special operation on the peripheral device also include the settings for displaying a guide explaining the method of setting paper to a cassette in the case of printing with paper fed from the cassette. Further, the present exemplary embodiment is not limited to the settings for display-ing a guide, but is also applicable to the case of notifying the user of an error content detected during the process of processing in a module of a device driver, such as the graphics driver 2202. In addition, the display control according to the present exemplary embodiment is also applicable to the case of giving a warning depending on print data and a printer status. Specifically, in a case where the first printing after replacement of print heads of the printer is detected during the process of printing, the user can be notified of content prompting the user to adjust the print heads.

Figure 6A:
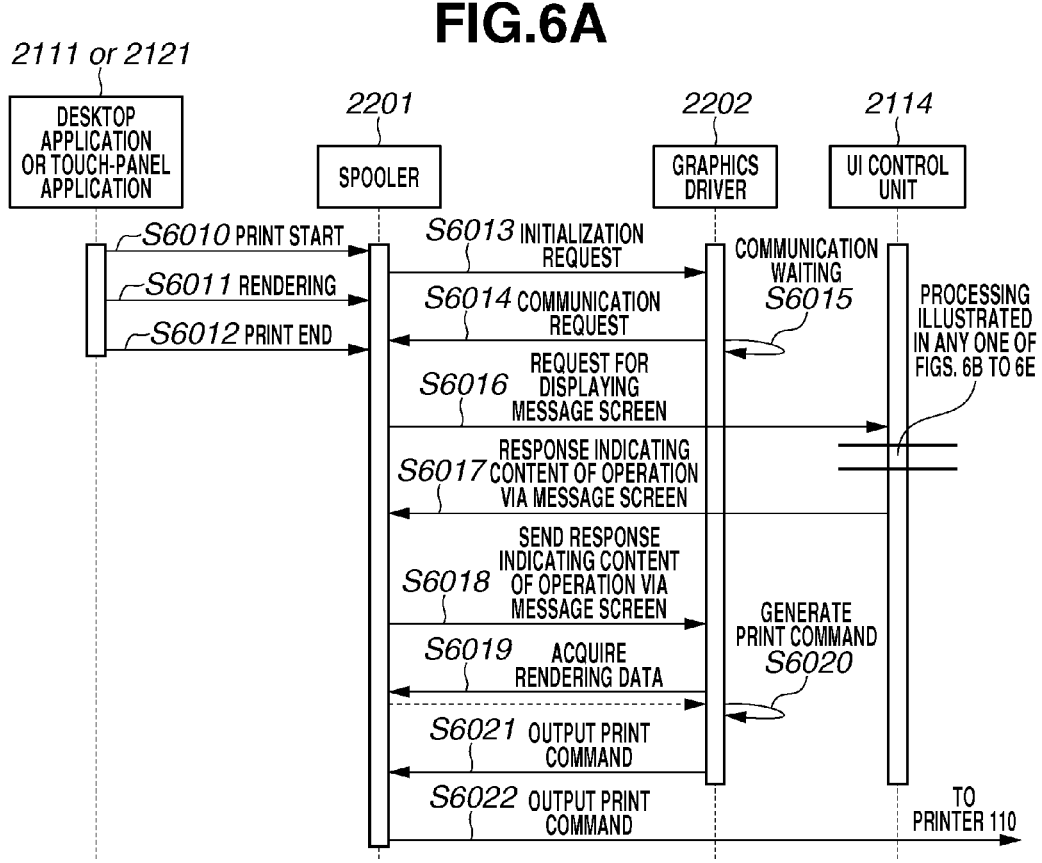

The desktop application 2111 and the touch-panel application 2121 differ in operation method, but have the same basic sequence of print processing, as illustrated in FIG. 6A. Therefore, in the present exemplary embodiment, only print processing using the desktop application 2111 is described. With regard to print processing using the touch-panel application 2121, the term "desktop application" can be replaced with "touch-panel application" as necessary in the following description.

Figure 5:
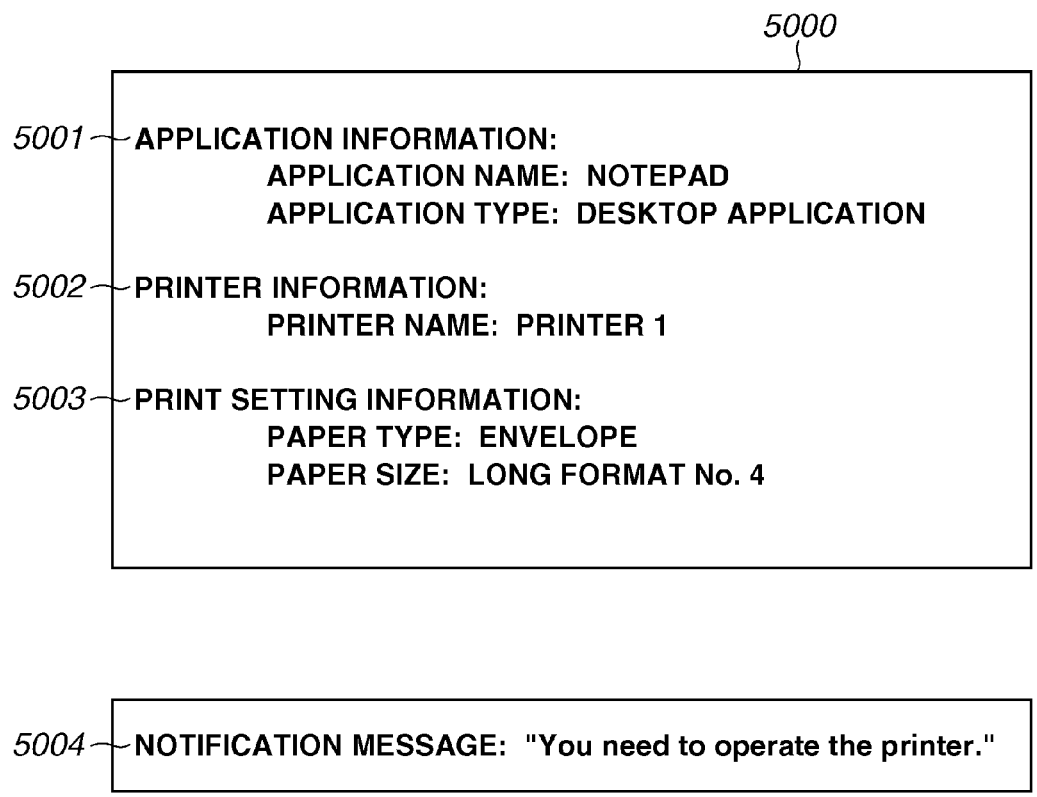
FIG. 5 illustrates examples of information associated with printing.

When print processing starts, the desktop application 2111 transmits a print processing request (steps S6010 to S6012) to the spooler 2201 by using the functions of the OS 2000. First, in step S6010, the desktop application 2111 makes a print start request. In the print start request in step S6010, the following printing-related information 5000 illustrated in FIG. 5 is transmitted to the spooler 2201:

(1) Application information 5001: the name of an application that performs printing and the type thereof (desktop application or touch-panel application);
(2) Printer information 5002: the name of a printer serving as a print output destination; and
(3) Print setting information 5003: print setting information set via the print setting UI 3200 or 4500. The above information is transmitted during printing to the UI control unit 2214 or the graphics driver 2202 via the spooler 2201.

In step S6011, the desktop application 2111 makes a rendering request so as to transmit printing content (rendering data). The data format of the printing content includes, for example, Extensible Markup Language (XML) Paper Specification (XPS) stream. Then, in step S6012, the desktop application 2111 makes a print end request so as to transmit information indicating the completion of transmission of the whole printing content.

In step S6013, in response to the print start request, the spooler 2201 issues an initialization request to the graphics driver 2202, which is compatible with the output-destination printer 110, based on the printer information 5002. The graphics driver 2202 analyzes print setting information transmitted as a part of the initialization request. In step S6014, the graphics driver 2202 issue a communication request to the spooler 2201 in a case where it is necessary to display a guide to the user during printing as in the case of envelope printing. In the present exemplary embodiment, the graphics driver 2202 analyzes only the print setting information to determine whether it is necessary to display a guide to the user. Besides such analysis, the graphics driver 2202 may analyze the current status of the printer 110 to determine whether it is necessary to display a guide to the user. For example, in a case where the printer status indicates the replacement of print heads, the display for prompting the user to adjust the print heads may be provided. The communication request includes, in addition to the printing-related information 5000 illustrated in FIG. 5, a communication message 5004, which is to be displayed on the notification screen 3400. In step S6015, the graphics driver 2202 enters a communication waiting state to wait for a response regarding a message screen. In step S6016, in response to the reception of the communication request, the spooler 2201 issues a display request for a message screen to the UI control unit 2114. In response to the reception of the display request, the UI control unit 2114 performs the following control processing to display the message screen.

The processing sequence for displaying the message screen 3300 or message screen 4700 described above with reference to FIGS. 3A, 3B, and 3C and FIG. 4 includes a plurality of types as illustrated in FIGS. 6B to 6E. The processing according to the first exemplary embodiment is described below with reference to the flowchart of FIG. 7.

In step S6017, the UI control unit 2114 transmits, to the spooler 2201, a response including content indicative of a user operation on the message screen. The user operation in step S6017 indicates the print start button 3304 being pressed by the user to start printing. In step S6018, the spooler 2201 transmits, to the graphics driver 2202, the response including content indicative of a user operation on the message screen. In response to the processing in step S6018, the graphics driver 2202 returns from the communication waiting state.

In step S6019, the graphics driver 2202 acquires rendering data from the spooler 2201, and in step S6020, generates print data, as a print command, using the print setting information and the print data. In step S6021, the graphics driver 2202 outputs the generated print data to the spooler 2201. In step S6022, the spooler 2201 outputs the print data to the printer 110 using the function of the OS 2000.

FIG. 7 is a flowchart illustrating processing for display control of the message screen according to the first exemplary embodiment. In the case of the illustrated processing, to prevent an increase of load due to the switching operation on UI environments, the message screen is displayed on the UI environment being currently displayed. A case is described where a subject that executes the flowchart of FIG. 7 is the UI control unit 2114, which is one of modules of the OS 2000. However, the UI control unit 2114 is not a restrictive one, but the graphics driver 2202 may be the subject.

In step S701, the UI control unit 2114 checks for a UI environment being currently provided (displayed) to the user on the touch-panel display 106. If it is determined that the desktop UI 3000 is being displayed on the touch-panel display 106 (YES in step S701), the processing proceeds to step S702. If it is determined that the touch-pane UI 4000 is being displayed on the touch-panel display 106 (NO in step S701), the processing proceeds to step S704. In step S702, the UI control unit 2114 requests the desktop UI display unit 2300 to display the message screen 3300. Then, the UI control unit 2114 waits for processing until the reception of a response generated based on a user operation on the message screen 3300 displayed on the desktop UI display unit 2300.

The sequence of processing arising from the processing in step S702 is described with reference to FIG. 6B.

First, in step S6101, the desktop UI display unit 2300 receives a display request, and in step S6102, displays the message screen 3300 on the desktop UI 3000, then waiting for a user operation. In step S6103, the desktop UI display unit 2300 transmits, to the UI control unit 2114, a response generated based on the user operation on the message screen 3300.

In step S703, the UI control unit 2114 transmits, to the graphics driver 2202, the response generated based on the user operation on the message screen 3300. Then, the processing ends. As a result of this processing, the graphics driver 2202 waits for a user operation on the message screen 3300, and then starts processing including generation of print data.

On the other hand, in step S704, the UI control unit 2114 requests the touch-panel UI notification unit 2123 to display the notification screen 4600 via the touch-panel UI display unit 2400. In step S705, the UI control unit 2114 waits for an input to the notification screen 4600 for a predetermined time.

The sequence of processing arising from the processing in step S704 is described with reference to FIG. 6C.

First, in step S6200, the UI control unit 2114 requests the touch-panel UI display unit 2400 to display the notification screen 4600. In step S6201, the touch-panel UI display unit 2400, having received the display request in step S6200, requests the touch-panel UI notification unit 2123 to display the notification screen 4600. The request content includes printer information and message language, which are content to be displayed on the notification screen 4600. In addition, the request content includes the name of a module intended to be opened when the notification screen 4600 is tapped. In the present exemplary embodiment, the touch-panel UI display unit 2400 is specified as the name of a module intended to be opened. In step S6202, the touch-panel UI notification unit 2123 displays the notification screen 4600 on the touch-panel UI 4000.

In the present exemplary embodiment, to allow the user to confirm that the touch-panel UI notification unit 2123 displays the message screen 4700 before the message screen 4700 is displayed, the notification screen 4600 is displayed on the touch-panel UI 4000. This is to prevent disturbing a user operation on a display screen being currently displayed by another application on the touch-panel UI 4000. The user can switch between display of the message screen 4700 (the notification screen 4600 being tapped) and nondisplay of the message screen 4700 (the notification screen 4600 not being tapped). The notification screen 4600 is displayed on the touch-panel UI 4000 for a predetermined time.

If the notification screen 4600 is tapped within the predetermined time, then in step S6203, the touch-panel UI notification unit 2123 notifies the UI control unit 2114 of the notification screen 4600 being tapped and the name of a module to be opened in the case of tapping. If the notification screen 4600 is not tapped within the predetermined time, the notification screen 4600 disappears from the touch-panel UI 4000.

In steps S706 and S708, the UI control unit 2114 determines, based on the notification from the touch-panel UI notification unit 2123, whether the notification screen 4600 is tapped within the predetermined time. If it is determined that the notification screen 4600 is tapped (YES in step S706), the processing proceeds to step S707. If it is determined that the notification screen 4600 is not tapped and the predetermined time has elapsed (NO in step S706 and YES in step S708), the processing proceeds to step S709. In step S707, the UI control unit 2114 requests the touch-panel UI display unit 2400 to display the message screen 4700. Then, the UI control unit 2114 waits for processing until the reception of a response generated based on a user operation on the message screen 4700 displayed on the touch-panel UI display unit 2400.

The sequence of processing arising from the processing in step S707 is described with reference to FIG. 6C.

In step S6204, the touch-panel UI display unit 2400 receives a display request, and in step S6205, displays the message screen 4700 on the touch-panel UI environment 2120. In step S6206, the touch-panel UI display unit 2400 sends, to the UI control unit 2114, a response generated based on a user operation on the message screen 4700.

In step S703, the UI control unit 2114 transmits, to the graphics driver 2202, the response generated based on the user operation on the message screen 4700. Then, the processing ends. As a result of this processing, the graphics driver 2202 waits for a user operation on the message screen 4700, and then starts processing including generation of print data.

In step S709, the UI control unit 2114 notifies the graphics driver 2202 of the absence of a user operation on the message screen 4700. Then, the processing ends.

In this instance, even if the predetermined time has elapsed without the notification screen being tapped and no user operation is performed on the message screen 4700 (step S709), the graphics driver 2202 may start processing including generation of print data.

As described above, according to the first exemplary embodiment, a UI environment being currently displayed is checked for, so that a message screen indicating a guide for envelope printing or the like is displayed on the currently displayed UI environment.

For example, the user may change the UI environment from the desktop UI environment 2110 to the touch-panel UI environment 2120 immediately after inputting a printing instruction via the desktop application 2111. Even in such a case where the UI environment is changed after the printing instruction is input, according to the first exemplary embodiment, the message screen 4700 is displayed on the currently displayed touch-panel UI environment 2120. On the other hand, the user may change the UI environment from the touch-panel UI environment 2120 to the desktop UI environment 2110 immediately after inputting a printing instruction via the touch-panel application 2121. Even in such a case where the UI environment is changed after the printing instruction is input, according to the first exemplary embodiment, the message screen 3300 is displayed on the currently displayed desktop UI environment 2110.

Thus, according to the first exemplary embodiment, a message screen, such as a guide message, usable for a processing request to a peripheral device can be provided onto a UI environment adapted for a user operation, so that user operability can be prevented from being deteriorated.

In addition, in the present exemplary embodiment, the message screen 4700 is displayed in response to an operation on the notification screen 4600. However, the message screen 4700 can be displayed on the currently displayed UI environment without the notification screen 4600 being operated. Thus, step S707 can be executed next to step S701.

Furthermore, in FIG. 6C, a case is described where the touch-panel UI display unit 2400 requests the touch-panel UI notification unit 2123 to display the notification screen 4600. However, the UI control unit 2114 may directly request the touch-panel UI notification unit 2123 to display the notification screen 4600. Thus, step S6201 may be omitted. In this case, the UI control unit 2114 requests the touch-panel UI notification unit 2123 to display the notification screen 4600 and specifies, to the touch-panel UI notification unit 2123, the touch-panel UI display unit 2400 (or an application implementing the touch-panel UI display unit 2400) as the name of a module intended to be opened when the notification screen 4600 is tapped. A request from the UI control unit 2114 to display the notification screen 4600 can be implemented by using a scheme of invocation that will be provided by an OS (although not being provided at present).

In the case of the first exemplary embodiment, a message screen is displayed on the currently displayed UI environment. On the other hand, in the case of a second exemplary embodiment, a case is described where a message screen is displayed on a UI environment under which an application used when the user issues a processing request to a peripheral device operates.

In the second exemplary embodiment, the detailed description of a device configuration and processing similar to those of the first exemplary embodiment is not repeated here.

Figure 8:
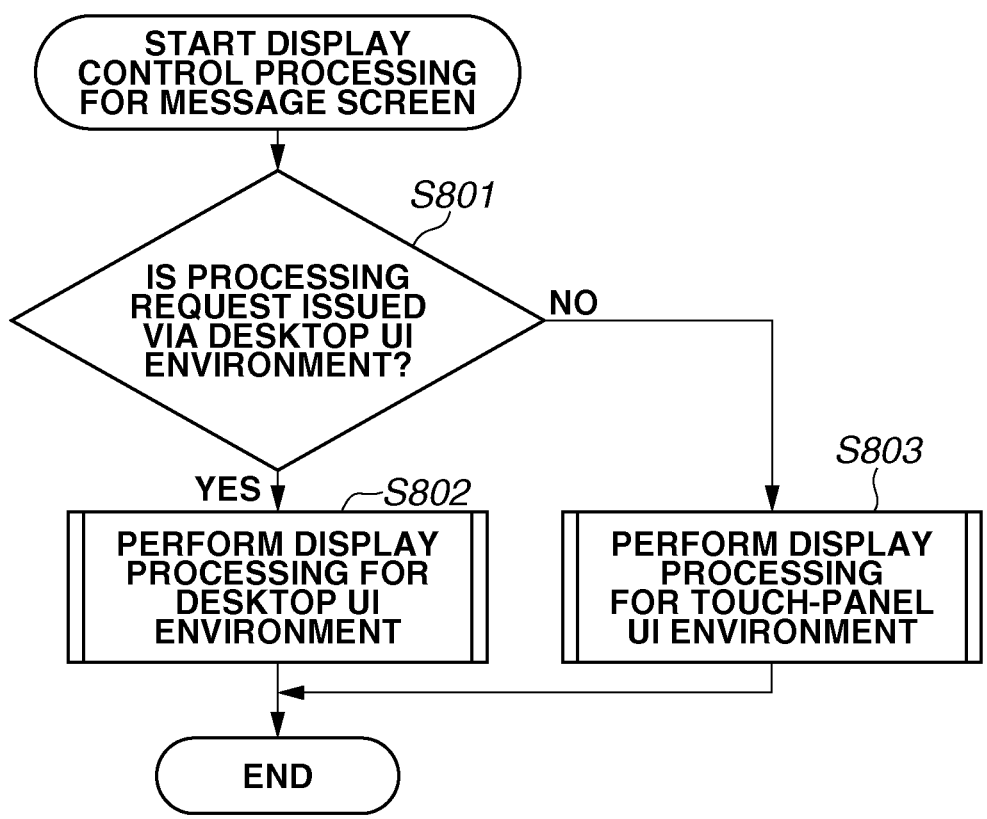
FIG. 8 is a flowchart illustrating processing performed to display a message screen according to a second exemplary embodiment.

FIG. 8 is a flowchart illustrating processing for display control of a message screen according to the second exemplary embodiment. This processing includes processing for displaying a message screen on a UI environment under which an application used for issuing a print execution instruction operates. A case is described where a subject that executes the flowchart of FIG. 8 is the UI control unit 2114, which is one of modules of the OS 2000. However, the UI control unit 2114 is not a restrictive one, but the graphics driver 2202 may be the subject. The processing illustrated in FIG. 8 is executed in place of the processing described with reference to FIG. 7 in the first exemplary embodiment.

In step S801, the UI control unit 2114 refers to the application information 5001 included in the printing-related information 5000 received from the spooler 2201 to determine via which UI environment application a processing request to the peripheral device has been issued. Specifically, the UI control unit 2114 determines whether a processing request to the peripheral device has been issued via the desktop UI 3000. If it is determined that a printing instruction has been issued via the desktop application 2111 on the desktop UI 3000 (YES in step S801), the processing proceeds to step S802. If it is determined that the printing instruction has been issued via the touch-panel application 2121 on the touch-panel UI 4000 (NO in step S801), the processing proceeds to step S803. In step S802, the UI control unit 2114 performs display processing for the desktop UI environment 2110. Then, the processing ends. In step S803, the UI control unit 2114 performs display processing for the touch-panel UI environment 2120. Then, the processing ends.

Display processing for the desktop UI display unit 2300 and display processing for the touch-panel UI display unit 2400 are described below with reference to FIGS. 9 and 10.

Figure 9:
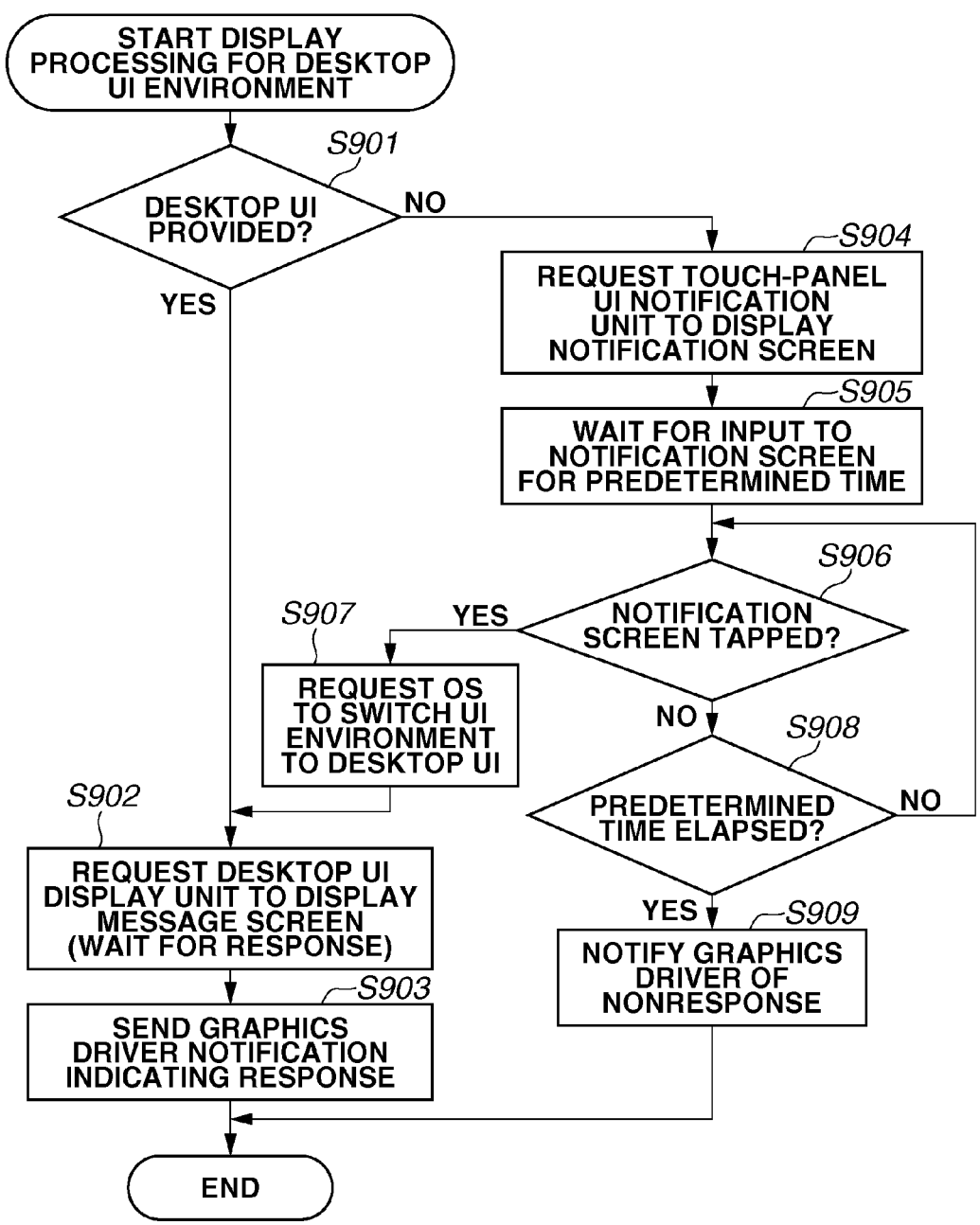
FIG. 9 illustrates processing for display control on a desktop UI environment according to the second exemplary embodiment.

FIG. 9 is a flowchart illustrating processing for display control of the message screen 3300 on the desktop UI environment 2110 based on a result of determination in step S801.

In step S901, the UI control unit 2114 checks for a UI environment being currently provided (displayed) on the touch-panel display 106. If it is determined that the desktop UI 3000 is being displayed on the touch-panel display 106 (YES in step S901), the processing proceeds to step S902. If it is determined that the touch-pane UI 4000 is being displayed on the touch-panel display 106 (NO in step S901), the processing proceeds to step S904. The processing in steps S902 and S903 is similar to that in steps S702 and S703 described in the first exemplary embodiment, and, therefore, the detailed description thereof is not repeated.

In step S904, the UI control unit 2114 requests the touch-panel UI notification unit 2123 to display the notification screen 4600. In step S905, the UI control unit 2114 waits for an input to the notification screen 4600 for a predetermined time. The request issued to the touch-panel UI notification unit 2123 includes printer information and message language, which are content to be displayed on the notification screen 4600. In addition, the request includes the name of a module intended to be opened when the notification screen 4600 is tapped. In the present exemplary embodiment, the desktop UI display unit 2300 is specified as the name of a module intended to be opened.

The sequence of processing arising from the processing in step S904 is described with reference to FIG. 6D.

First, in step S6300, the UI control unit 2114 requests the touch-panel UI notification unit 2123 to display the notification screen 4600. In step S6301, in response to the reception of the display request, the touch-panel UI notification unit 2123 displays the notification screen 4600 illustrated in FIG. 4D on the touch-panel UI 4000.

In the present exemplary embodiment, to allow the user to confirm that the touch-panel UI notification unit 2123 displays the message screen 3300 before the message screen 3300 is displayed, the notification screen 4600 is displayed on the touch-panel UI 4000.

If the notification screen 4600 is tapped within a predetermined time for which the notification screen 4600 is to be displayed on the touch-panel UI 4000, then, in step S6302, the touch-panel UI notification unit 2123 notifies the UI control unit 2114 of the notification screen 4600 being tapped and the name of a module to be opened in the case of tapping. If the notification screen 4600 is not tapped within the predetermined time, the notification screen 4600 disappears from the touch-panel UI 4000.

In steps S906 and S908, the UI control unit 2114 determines, based on the notification from the touch-panel UI notification unit 2123, whether the notification screen 4600 is tapped within the predetermined time. If it is determined that the notification screen 4600 is tapped (YES in step S906), the processing proceeds to step S907. If it is determined that the notification screen 4600 is not tapped and the predetermined time has elapsed (NO in step S906 and YES in step S908), the processing proceeds to step S909. The processing in step S909 is similar to that in step S709, and, therefore, the detailed description thereof is not repeated.

In step S907, the UI control unit 2114 requests the OS 2000 to switch a UI environment to be displayed on the touch-panel display 106 to the desktop UI 3000. Then, the processing proceeds to step S902.

The sequence of processing arising from the processing in step S902 is described with reference to FIG. 6D.

In step S6303, the desktop UI display unit 2300 receives a display request from the UI control unit 2114, and in step S6304, displays the message screen 3300 on the desktop UI environment 2110. In step S6305, the desktop UI display unit 2300 sends, to the UI control unit 2114, a response generated based on a user operation on the message screen 3300.

In step S903, the UI control unit 2114 notifies the graphics driver 2202 of the response generated based on a user operation on the message screen 3300. Then, the processing ends. As a result of this processing, the graphics driver 2202 waits for a user operation on the message screen 3300, and then starts processing including generation of print data.

Figure 10:
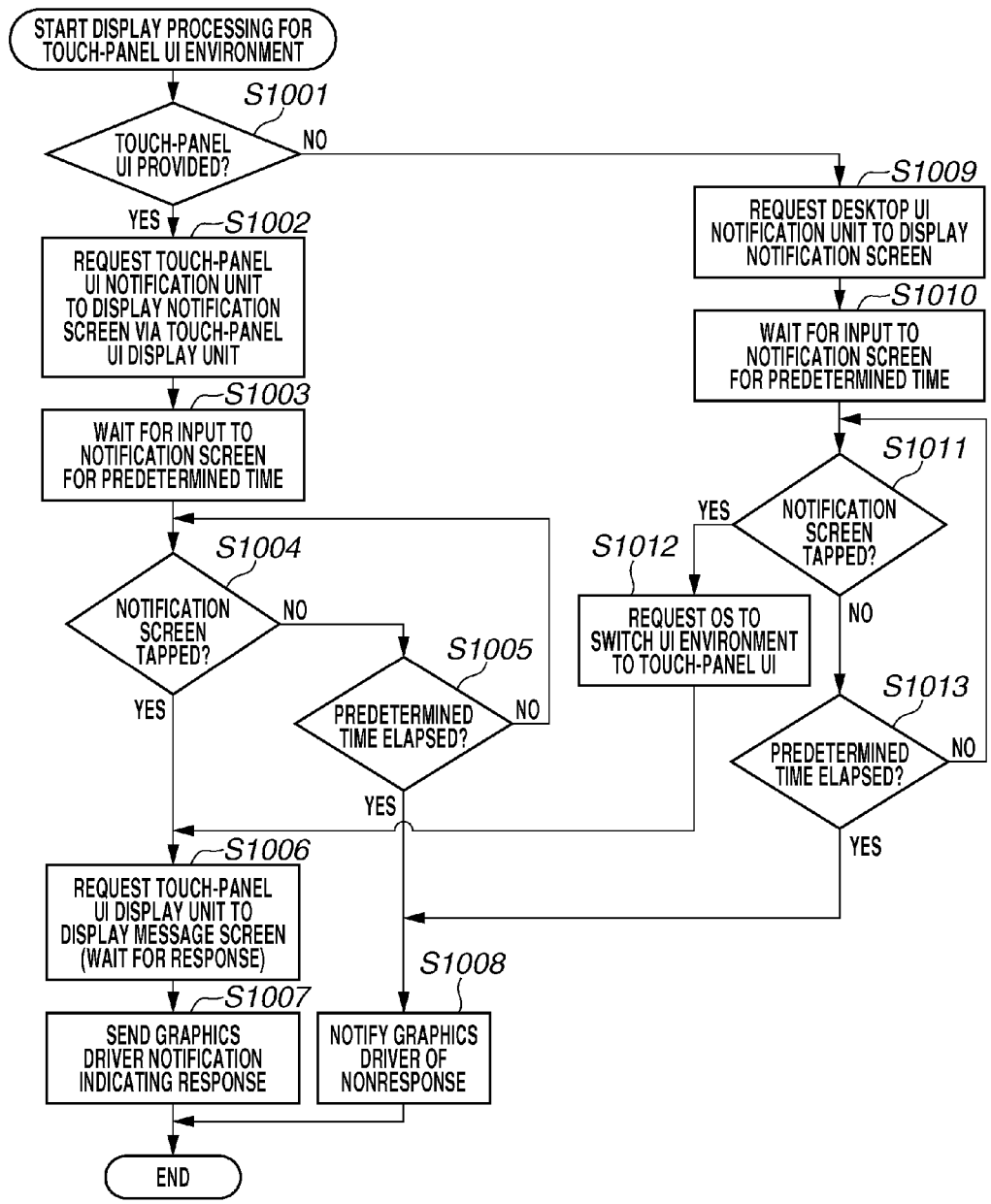
FIG. 10 illustrates processing for display control on a touch-panel UI environment according to the second exemplary embodiment.

FIG. 10 is a flowchart illustrating processing for display control of the message screen 4700 on the touch-panel UI environment 2120 based on a result of determination in step S801.

In step S1001, the UI control unit 2114 checks for a UI environment being currently provided (displayed) to the user on the touch-panel display 106. If it is determined that the desktop UI 3000 is being displayed on the touch-panel display 106 (NO in step S1001), the processing proceeds to step S1009. If it is determined that the touch-pane UI 4000 is being displayed on the touch-panel display 106 (YES in step S1001), the processing proceeds to step S1002.

The processing in steps S1002 to S1008 is similar to that in steps S704, S705, S706, S708, S707, S703, and S709, respectively, described with reference to FIG. 7 in the first exemplary embodiment, and, therefore, the detailed description thereof is not repeated.

In step S1009, the UI control unit 2114 requests the desktop UI notification unit 2113 to display the notification screen 3400. In step S1010, the UI control unit 2114 waits for an input to the notification screen 3400 for a predetermined time.

The request issued to the desktop UI notification unit 2113 includes printer information and message language, which are content to be displayed on the notification screen 3400. In addition, the request includes the name of a module to be opened when the notification screen 3400 is tapped. In the present exemplary embodiment, the touch-panel UI display unit 2400 is specified as the module.

The sequence of processing arising from the processing in step S1009 is described with reference to FIG. 6E.

First, in step S6400, the UI control unit 2114 requests the desktop UI notification unit 2113 to display the notification screen 3400. In step S6401, the desktop UI notification unit 2113 displays the notification screen 3400, illustrated in FIG. 3C, for the desktop UI notification unit 2113 on the desktop UI 3000.

In the case of the second exemplary embodiment, to allow the user to confirm that the desktop UI notification unit 2113 displays the message screen 4700 before the message screen 4700 is displayed, the notification screen 3400 is displayed on the desktop UI 3000.

If the notification screen 3400 is tapped within a predetermined time for which the notification screen 3400 is to be displayed on the desktop UI 3000, then, in step S6402, the desktop UI notification unit 2113 notifies the UI control unit 2114 of the notification screen 3400 being tapped and the name of a module to be opened in the case of tapping. If the notification screen 3400 is not tapped within the predetermined time, the notification screen 3400 disappears from the desktop UI 3000.

In steps S1011 and S1013, the UI control unit 2114 determines, based on the notification from the desktop UI notification unit 2113, whether the notification screen 3400 is tapped within the predetermined time. If it is determined that the notification screen 3400 is tapped (YES in step S1011), the processing proceeds to step S1012. If it is determined that the notification screen 3400 is not tapped within the predetermined time and the predetermined time has elapsed (NO in step S1011 and YES in step S1013), the processing proceeds to step S1008. The processing in step S1008 is similar to that in step S709, and, therefore, the detailed description thereof is not repeated.

In step S1012, the UI control unit 2114 requests the OS 2000 to switch a UI environment to be displayed on the touch-panel display 106 from the desktop UI 3000 to the touch-panel UI 4000. Then, the processing proceeds to step S1006.

The sequence of processing arising from the processing in step S1006 is described with reference to FIG. 6E.

In step S6403, the touch-panel UI display unit 2400 receives a display request from the UI control unit 2114, and in step S6404, displays the message screen 4700 on the touch-panel UI environment 2120. In step S6405, the touch-panel UI display unit 2400 sends, to the UI control unit 2114, a response generated based on a user operation on the message screen 4700.

In step S1007, the UI control unit 2114 notifies the graphics driver 2202 of the response generated based on a user operation on the message screen 4700. Then, the processing ends. As a result of this processing, the graphics driver 2202 waits for a user operation on the message screen 4700, and then starts processing including generation of print data.

As described above, in the second exemplary embodiment, a message screen indicating a guide for envelope printing or the like is displayed on a UI environment under which an application used when the user issues a processing request to the peripheral device operates.

For example, suppose a case where a plurality of processing requests is respectively issued via a plurality of UI environments. Even in such a case, an application used when a processing request is issued and a message screen are displayed on the same UI environment. Therefore, the user can easily recognize to which request the displayed message screen corresponds. Thus, operability can improve.

In a third exemplary embodiment, unlike the above-described first and second exemplary embodiments, processing in a case where it is impossible to display a message screen using the desktop UI display unit 2300 or the touch-panel UI display unit 2400 is supposed.

Specifically, the touch-panel UI display unit 2400 is distributed as an application from an external service via the network 109. Therefore, it is necessary to suppose a case where the touch-panel UI display unit 2400 is not installed on the OS 2000. Also, a hardware vendor for the peripheral device may develop and provide only one of the desktop UI display unit 2300 and the touch-panel UI display unit 2400. Accordingly, a situation in which one of the desktop UI display unit 2300 and the touch-panel UI display unit 2400 is not installed may be supposed. Furthermore, the desktop UI display unit 2300 or the touch-panel UI display unit 2400 does not support the capability of displaying a message screen.

Thus, the third exemplary embodiment is directed to display control for a UI environment capable of displaying a message screen.

In the third exemplary embodiment, the detailed description of a device configuration and processing similar to those of the above-described exemplary embodiments is not repeated here.

Figure 11:
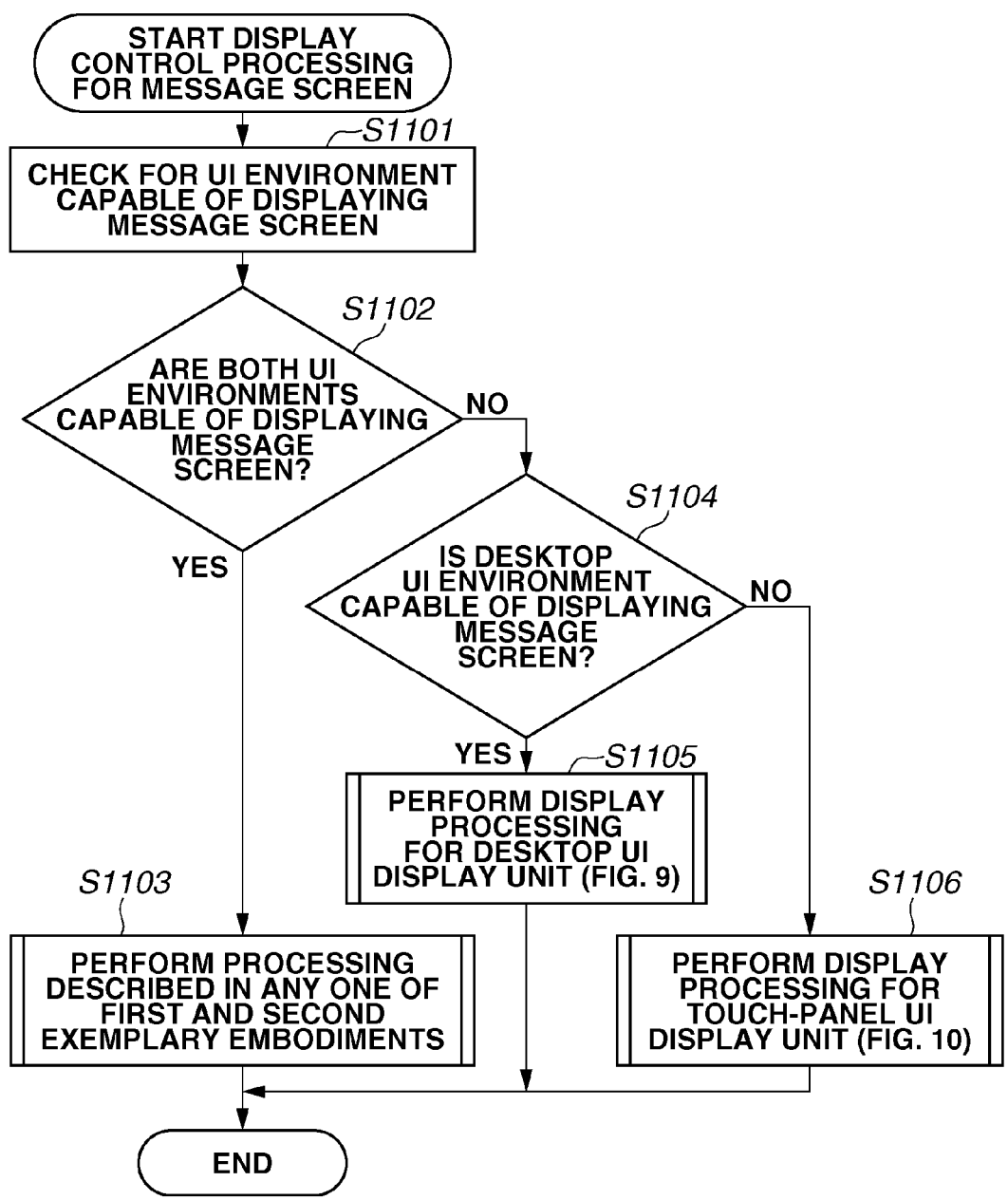
FIG. 11 is a flowchart illustrating processing performed to display a message screen according to a third exemplary embodiment.

FIG. 11 is a flowchart illustrating processing for display control of a message screen according to the third exemplary embodiment. A case is described where a subject that executes the flowchart of FIG. 11 is the UI control unit 2114, which is one of modules of the OS 2000. However, the UI control unit 2114 is not a restrictive one, but the graphics driver 2202 may be the subject. The processing illustrated in FIG. 11 is executed in place of the processing described with reference to FIG. 7 in the first exemplary embodiment.

In step S1101, the UI control unit 2114 checks for a UI environment capable of displaying the message screen 3300 or 4700. More specifically, in a case where the desktop UI display unit 2300 or the touch-panel UI display unit 2400 is already installed in the UI environment, the UI control unit 2114 determines whether the UI environment has the capability of displaying a message screen based on a result of an inquiry about version information or capability information of the respective display units. If the desktop UI display unit 2300 or the touch-panel UI display unit 2400 is not installed, the UI control unit 2114 determines that the corresponding UI environment is not capable of displaying a message screen. In step S1102, the UI control unit 2114 determines whether both the UI environments are capable of displaying a message screen. If it is determined that both the UI environments are capable of displaying a message screen (YES in step S1102), the processing proceeds to step S1103, in which the UI control unit 2114 performs processing described in any one of the first and second exemplary embodiments. If it is determined that not both the UI environments are capable of displaying a message screen (NO in step S1102), the processing proceeds to step S1104.

In step S1104, the UI control unit 2114 determines whether which of the UI environments is capable of displaying a message screen. If it is determined that the desktop UI environment is capable of displaying the message screen 3300 (YES in step S1104), the processing proceeds to step S1105. In step S1105, the UI control unit 2114 performs processing described above with reference to FIG. 9. If it is determined that the desktop UI environment is not capable of displaying the message screen 3300 (NO in step S1104), the processing proceeds to step S1106. In step S1106, the UI control unit 2114 performs processing described above with reference to FIG. 10.

In addition, if neither of the UI environments is capable of displaying a message screen, the UI control unit 2114 displays an error message (not illustrated).

As described above, in the third exemplary embodiment, the first and second embodiments are modified in consideration of a UI environment capable of displaying a message screen, so that any decrease in user operability can be prevented.

In the first to third exemplary embodiments, a case is described where there is present the UI control unit 2114, which provides the message screen 3300 or the message screen 4700 to the associated UI environment. However, a case may be considered where a certain type of OS cannot provide such a function as the UI control unit 2114. Under such an OS, the graphics driver 2202 cannot request such an environment as the desktop UI 3000 or the touch-panel UI 4000 to display a message screen.

Figure 12:
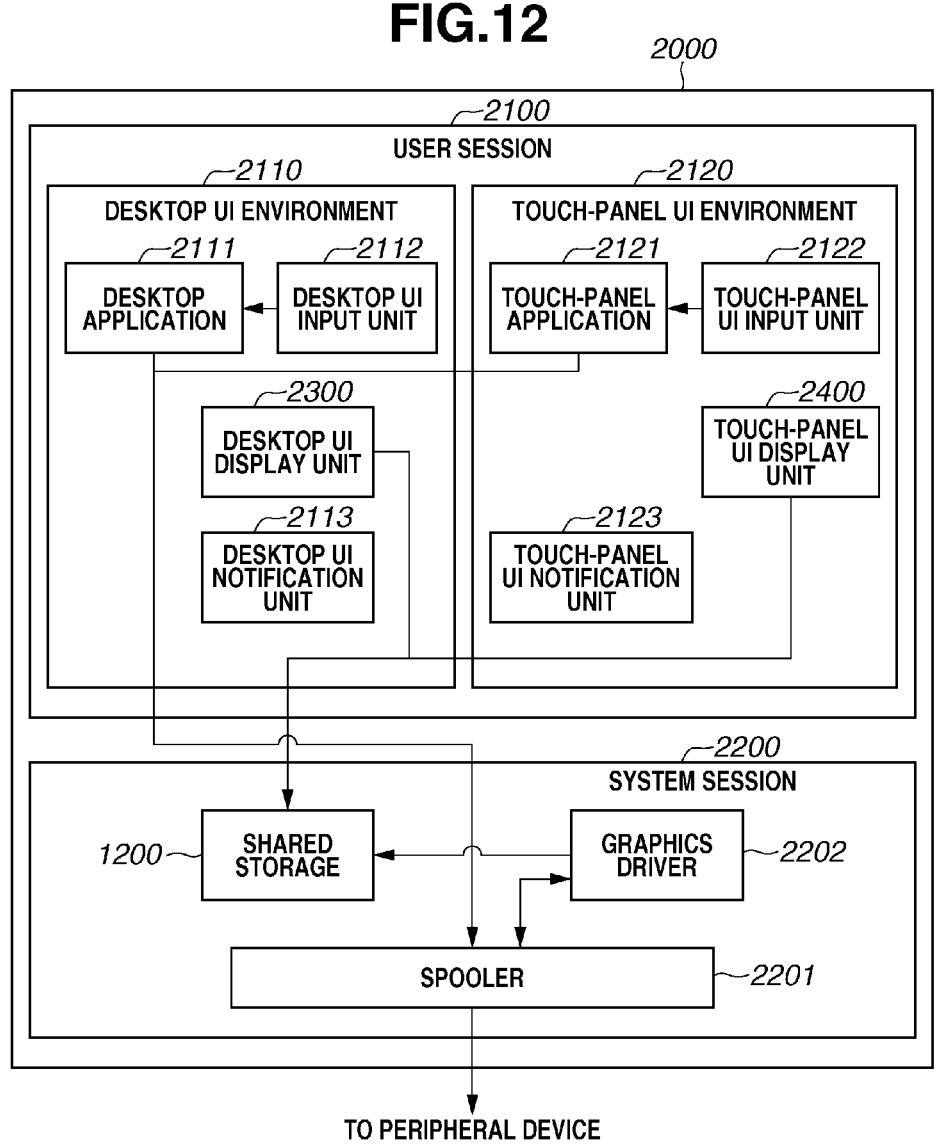
FIG. 12 illustrates an example of a module configuration of software of an information processing apparatus according to a fourth exemplary embodiment.

In the case of a fourth exemplary embodiment, with such an OS in mind, a method for providing a message screen to the user via a module configuration illustrated in FIG. 12 is described.

In the fourth exemplary embodiment, the detailed description of a device configuration and processing similar to those of the above-described exemplary embodiments is not repeated here.

FIG. 12 illustrates an example of a module configuration of software of the information processing apparatus according to the fourth exemplary embodiment. FIG. 12 differs from FIG. 2 in that the system session 2200 includes a shared storage 1200 and does not include the UI control unit 2114. The shared storage 1200 is a predetermined storage area which the desktop UI display unit 2300, the touch-panel UI display unit 2400, and the graphics driver 2202 can commonly use for reading and writing (referencing). The other modules are similar to those illustrated in FIG. 2, and, therefore, the description thereof is not repeated.

Figure 13:
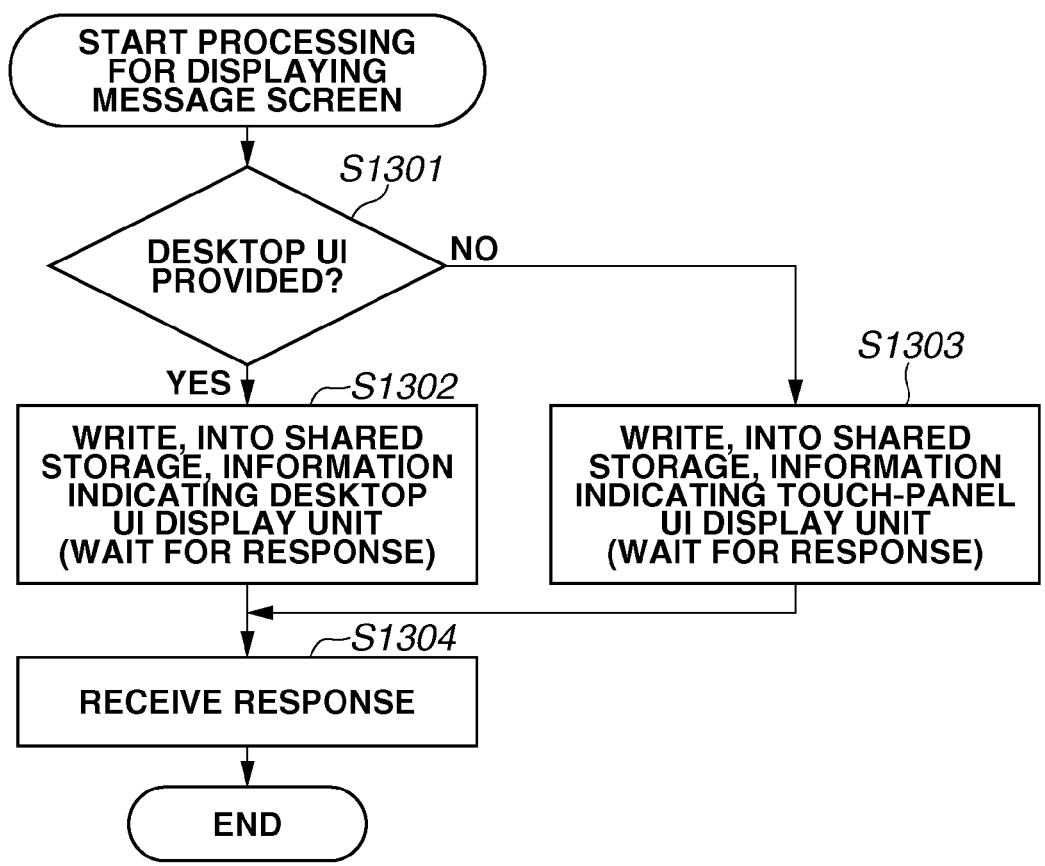
FIG. 13 is a flowchart illustrating processing performed by a graphics driver according to the fourth exemplary embodiment.

FIG. 13 is a flowchart illustrating processing for displaying a message screen on the currently displayed UI environment. A subject that executes the flowchart of FIG. 13 is the graphics driver 2202. The processing illustrated in FIG. 13 is executed in place of the processing performed by the UI control unit 2114 for displaying a message screen described with reference to FIG. 7 in the system of the first exemplary embodiment.

In step S1301, the graphics driver 2202 determines which of the UI environments is provided on the touch-panel display 106. Specifically, the graphics driver 2202 determines whether the desktop UI 300 is currently provided (displayed). This determination is performed by calling an application programming interface (API) provided by the OS 2000. If the desktop UI 3000 is provided on the touch-panel display 106 (YES in step S1301), the processing proceeds to step S1302. If the touch-panel UI 4000 is provided on the touch-panel display 106 (NO in step S1301), the processing proceeds to step S1303.

In step S1302, the graphics driver 2202 writes, into the shard storage 1200, information indicating the desktop UI display unit 2300 as a module on which to display a message screen, and waits for a response from the desktop UI display unit 2300. On the other hand, in step S1303, the graphics driver 2202 writes, into the shard storage 1200, information indicating the touch-panel UI display unit 2400 as a module on which to display a message screen, and waits for a response from the touch-panel UI display unit 2400.

In step S1304, the graphics driver 2202 receives a response generated based on a user operation on the message screen 3300 or the message screen 4700 displayed according to the processing in step S1302 or S1303. Then, the processing ends. In this instance, the graphics driver 2202 receives the response, for example, by referring to content written in the shared storage 1200 by the desktop UI display unit 2300 or the touch-panel UI display unit 2400. Accordingly, the graphics driver 2202 waits for a user operation on the message screen, and then starts processing including generation of print data.

FIGS. 14A and 14B are flowcharts illustrating processing for display control of the message screen performed by the respective UI environment display units.

FIG. 14A is a flowchart illustrating processing for display control performed by the desktop UI display unit 2300.

In step S1401, the desktop UI display unit 2300 is activated in a resident manner without displaying a UI or the like. The timing at which the desktop UI display unit 2300 is activated includes the start of activation of the OS, the start of printing, and so on. In step S1402, the desktop UI display unit 2300 refers to the shard storage 1200. In step S1403, the desktop UI display unit 2300 determines whether information indicating the desktop UI display unit 2300 as a module on which to display a message screen is stored in the shared storage 1200. If it is determined that the information indicating the desktop UI display unit 2300 is stored (YES in step S1403), the processing proceeds to step S1404. If it is determined that the information is not stored (NO in step S1403), the processing returns to step S1402, in which the desktop UI display unit 2300 refers to the shared storage 1200 to check for any writing of new information. In step S1404, the desktop UI display unit 2300 displays the message screen 3300.

In step S1405, the desktop UI display unit 2300 writes, into the shared storage 1200, content of a user operation on the message screen 3300. In this case, the desktop UI display unit 2300 may directly transmit content of a user operation on the message screen 3300 to the graphics driver 2202. Then, the desktop UI display unit 2300 closes the message screen 3300, and the processing returns to step S1402.

FIG. 14B is a flowchart illustrating processing for display control performed by the touch-panel UI display unit 2400.

In step S1411, the touch-panel UI display unit 2400 is activated in a resident manner without displaying a UI or the like. The timing at which the touch-panel UI display unit 2400 is activated includes the start of activation of the OS, the start of printing, and so on. In step S1412, the touch-panel UI display unit 2400 refers to the shard storage 1200. In step S1413, the touch-panel UI display unit 2400 determines whether information indicating the touch-panel UI display unit 2400 as a module on which to display a message screen is stored in the shared storage 1200. If it is determined that the information indicating the touch-panel UI display unit 2400 is stored (YES in step S1413), the processing proceeds to step S1414. If it is determined that the information is not stored (NO in step S1413), the processing returns to step S1412, in which the touch-panel UI display unit 2400 refers to the shared storage 1200 to check for any writing of new information. In step S1414, the touch-panel UI display unit 2400 displays the message screen 4700.

In step S1415, the touch-panel UI display unit 2400 writes, into the shared storage 1200, content of a user operation on the message screen 4700. In this case, the touch-panel UI display unit 2400 may directly transmit content of a user operation on the message screen 4700 to the graphics driver 2202. Then, the touch-panel UI display unit 2400 closes the message screen 4700, and the processing returns to step S1412.

Figure 15:
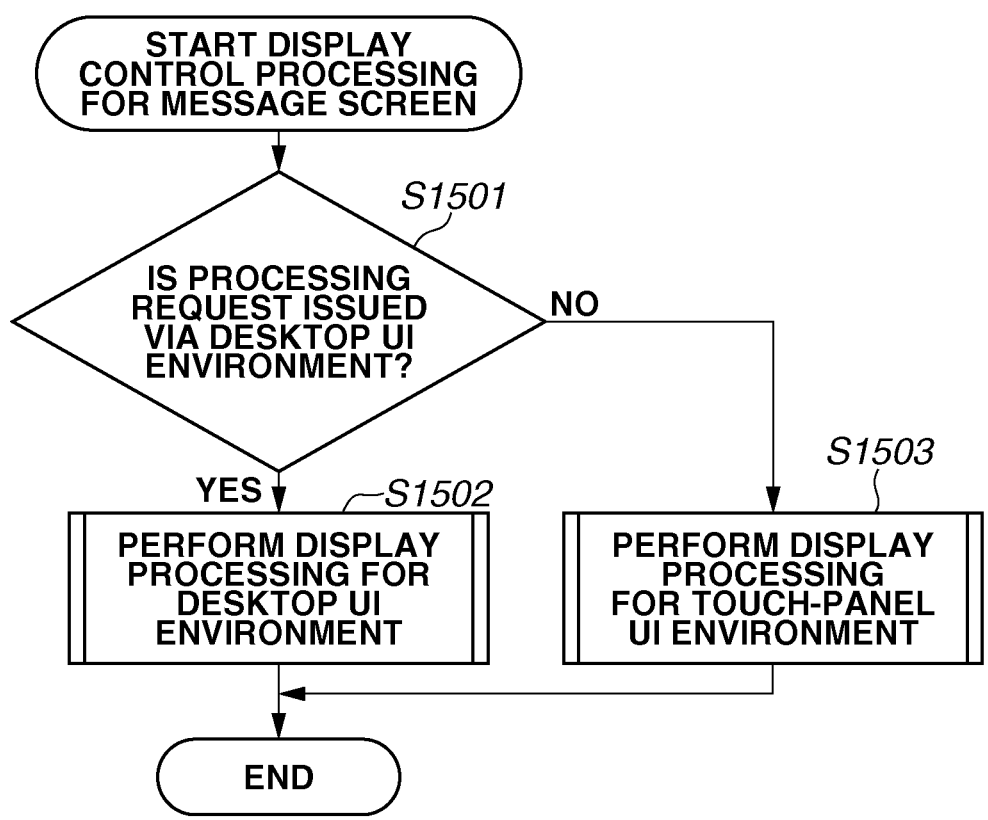
FIG. 15 is a flowchart illustrating processing performed to display a message screen according to the fourth exemplary embodiment.

FIG. 15 is a flowchart illustrating processing of display control of a message screen according to the fourth exemplary embodiment. The present processing illustrated in FIG. 15 is, unlike FIG. 13, to display a message screen on a UI environment under which an application used by the user to issue a processing request runs. A subject that executes the flowchart of FIG. 15 is the graphics driver 2202. The processing illustrated in FIG. 15 is executed in place of the processing performed by the UI control unit 2114 for displaying a message screen described with reference to FIG. 7 in the system of the first exemplary embodiment.

In step S1501, the graphics driver 2202 refers to the application information 5001 included in the printing-related information 5000 received from the spooler 2201 to determine via which UI environment application a processing request to the peripheral device has been issued. Specifically, the graphics driver 2202 determines whether a processing request to the peripheral device has been issued via the desktop UI 3000. If it is determined that a printing instruction has been issued via the desktop application 2111 on the desktop UI 3000 (YES in step S1501), the processing proceeds to step S1502. If it is determined that the printing instruction has been issued via the touch-panel application 2121 on the touch-panel UI 4000 (NO in step S1501), the processing proceeds to step S1503. In step S1502, the graphics driver 2202 performs display processing for the desktop UI environment 2110. Then, the processing ends. In step S1503, the graphics driver 2202 performs display processing for the touch-panel UI environment 2120. Then, the processing ends.

Display processing for the desktop UI display unit 2300 and display processing for the touch-panel UI display unit 2400 are described below with reference to FIGS. 16A and 16B, respectively.

FIG. 16A is a flowchart illustrating processing for display control of the message screen 3300 on the desktop UI environment 2110 based on a result of determination in step S1501.

In step S1601, the graphics driver 2202 checks for a UI environment being currently provided (displayed) on the touch-panel display 106. If it is determined that the desktop UI 3000 is being displayed on the touch-panel display 106 (YES in step S1601), the processing proceeds to step S1602. If it is determined that the touch-pane UI 4000 is being displayed on the touch-panel display 106 (NO in step S1601), the processing proceeds to step S1604. In step S1604, the graphics driver 2202 requests the OS 2000 to switch a UI environment to be displayed on the touch-panel display 106 to the desktop UI 3000. Then, the processing proceeds to step S1602. The processing in steps S1602 and S1603 is similar to that in steps S1302 and S1304 described with reference to FIG. 13, and, therefore, the detailed description thereof is not repeated. Then, the graphics driver 2202 terminates the processing.

FIG. 16B is a flowchart illustrating processing for display control of the message screen 4700 on the touch-panel UI environment 2120 based on a result of determination in step S1501.

In step S1611, the graphics driver 2202 checks for a UI environment being currently provided (displayed) on the touch-panel display 106. If it is determined that the touch-panel UI 4000 is being displayed on the touch-panel display 106 (YES in step S1611), the processing proceeds to step S1612. If it is determined that the desktop UI 3000 is being displayed on the touch-panel display 106 (NO in step S1611), the processing proceeds to step S1614. In step S1614, the graphics driver 2202 requests the OS 2000 to switch a UI environment to be displayed on the touch-panel display 106 to the touch-panel UI 4000. Then, the processing proceeds to step S1612. The processing in steps S1612 and S1613 is similar to that in steps S1303 and S1304 described with reference to FIG. 13, and, therefore, the detailed description thereof is not repeated. Then, the graphics driver 2202 terminates the processing.

As described above according to the present exemplary embodiment, even if the function of an OS for displaying a message screen on each of the desktop UI 3000 and the touch-panel UI 4000 is not presupposed, the use of the shared storage 1200 enables providing a similar function.

In the first to fourth exemplary embodiments, there is described a method for providing a guide indication used at the time of setting of envelope printing or the like under an OS that exclusively provides a plurality of UI environments. However, when the user has become accustomed to such an operation procedure for the peripheral device, displaying such a message screen may be dispensed with.

Thus, in the following fifth to seventh exemplary embodiments, a method for appropriately omitting displaying of a message screen is described. The detailed description of a device configuration or processing content that are similar to those in the above-described exemplary embodiments is not repeated here.

The configuration example of modules corresponding to the functions of the OS 2000, which runs on the information processing apparatus 100, according to the fifth to seventh exemplary embodiments includes the configuration illustrated in FIG. 2 and the shared storage 1200 described in FIG. 12.

In the fifth exemplary embodiment, processing for performing display control of a message screen in consideration of the currently displayed UI environment and, in addition, in consideration of the check or uncheck of a checkbox for "no more display this message" in the message screen is described.

FIG. 17 is a flowchart illustrating processing performed when a display unit in each UI environment (the desktop UI display unit 2300 or the touch-panel UI display unit 2400) receives a processing request for the message screen.

The timing at which the desktop UI display unit 2300 or the touch-panel UI display unit 2400 receives the processing request is similar to that described in FIGS. 6B to 6E, and, therefore, the detailed description thereof is not repeated. In the following, processing that is performed by the desktop UI display unit 2300 is described in detail. With regard to processing that is performed by the touch-panel UI display unit 2400, the term "desktop UI display unit 2300" may be replaced with the term "touch-panel UI display unit 2400" in the following description.

In step S1701, the desktop UI display unit 2300 receives a display request for a message screen and displays the message screen. In step S1702, the desktop UI display unit 2300 waits for a response generated based on a user operation on the message screen.

In step S1703, the desktop UI display unit 2300, receiving the response from the user, determines whether a checkbox 3303 for "no more display this message" illustrated in FIG. 3B is checked (valid) as a result of the user operation. If the checkbox 3303 is valid (YES in step S1703), the processing proceeds to step S1705. Otherwise (NO in step S1703), the processing proceeds to step S1704. In step S1705, the desktop UI display unit 2300 writes, into the shard storage 1200, information indicating that the checkbox 3303 for "no more display this message" is checked (valid). In step S1704, the desktop UI display unit 2300 closes the message screen. Then, the processing ends.

Figure 18:
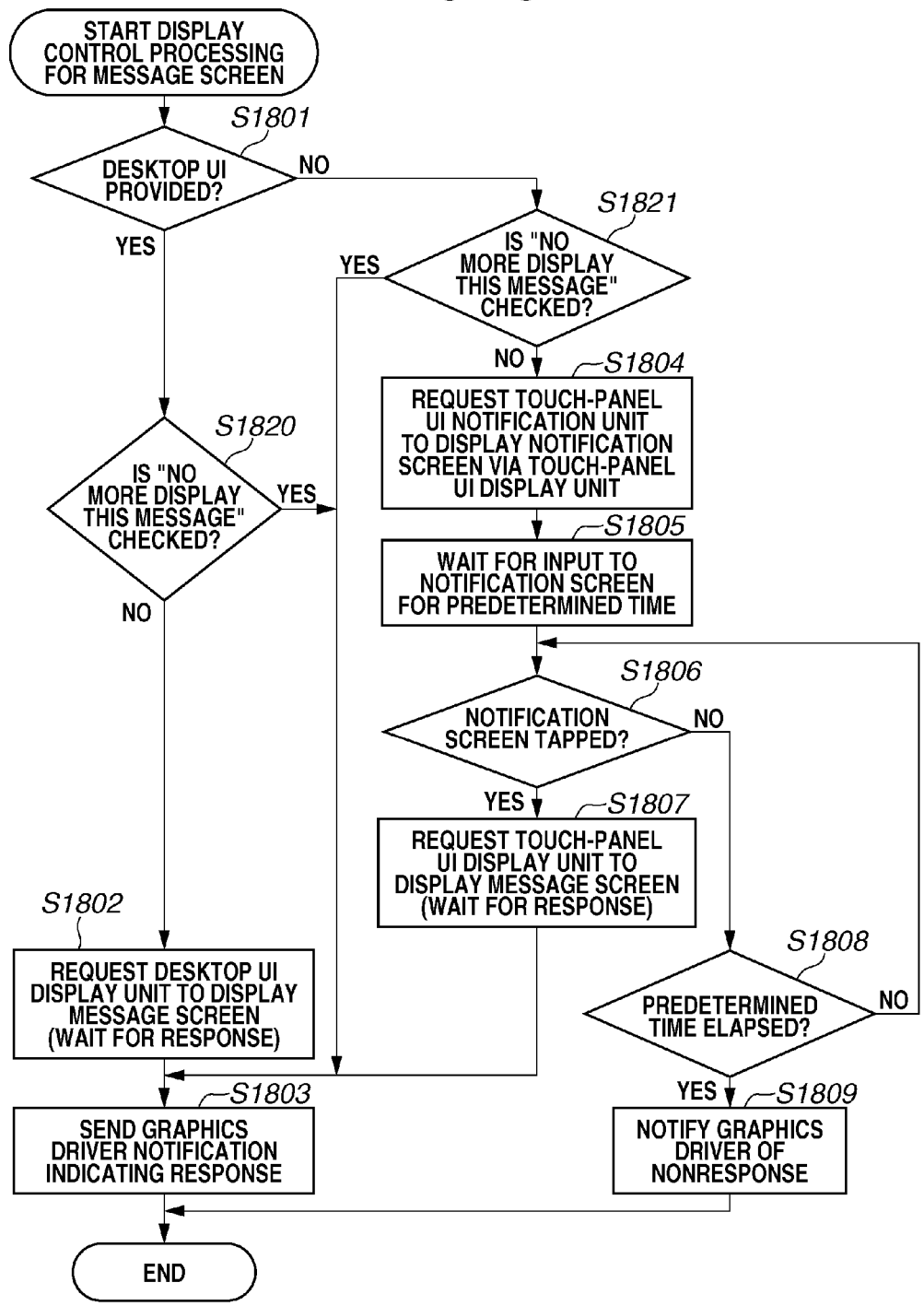
FIG. 18 is a flowchart illustrating processing performed to display a message screen according to the fifth exemplary embodiment.

FIG. 18 is a flowchart illustrating processing for display control of a message screen on the currently displayed UI environment according to the fifth exemplary embodiment. A case is described where a subject that executes the flowchart of FIG. 18 is the UI control unit 2114, which is one of modules of the OS 2000. However, the UI control unit 2114 is not a restrictive one, but the graphics driver 2202 may be the subject. The processing illustrated in FIG. 18 is executed in place of the processing described with reference to FIG. 7 in the first exemplary embodiment.

In each of steps S1820 and S1821, which are features of the present processing, a determination is made according to the above-mentioned information written in step S1705. Processing in steps S1801 to S1809 is similar to that in steps S701 to S709 illustrated in FIG. 7, and, therefore, the description thereof is not repeated here.

In step S1820, the UI control unit 2114 refers to the shared storage 1200 to determine whether there is present the information indicating that the checkbox 3303 for "no more display this message" is valid. If there is the information (YES in step S1820), the processing proceeds to step S1803. If there is not the information indicating that the checkbox 3303 for "no more display this message" is valid (NO in step S1820), the processing proceeds to step S1802, in which the UI control unit 2114 issues a display request for the message screen 3300.

In step S1821, the UI control unit 2114 refers to the shared storage 1200 to determine whether there is present the information indicating that the checkbox 4703 for "no more display this message" is valid. If there is the information (YES in step S1821), the processing proceeds to step S1803. If there is not the information indicating that the checkbox 4703 for "no more display this message" is valid (NO in step S1821), the processing proceeds to step S1804.

In a case where the processing proceeds to step S1803 after YES in step S1820 or YES in step S1821, the UI control unit 2114 issues, to the graphics driver 2202, a notification equivalent to the print start button being pressed by the user. This enables starting processing, including generation of print data by the graphics driver 2202, while dispensing with display of a message screen.

In the sixth exemplary embodiment, processing is described for performing display control of a message screen on a UI environment under which an application used by the user to issue a processing request to the peripheral device runs, in consideration of the check or uncheck of a checkbox for "no more display this message" in the message screen.

Figure 19:
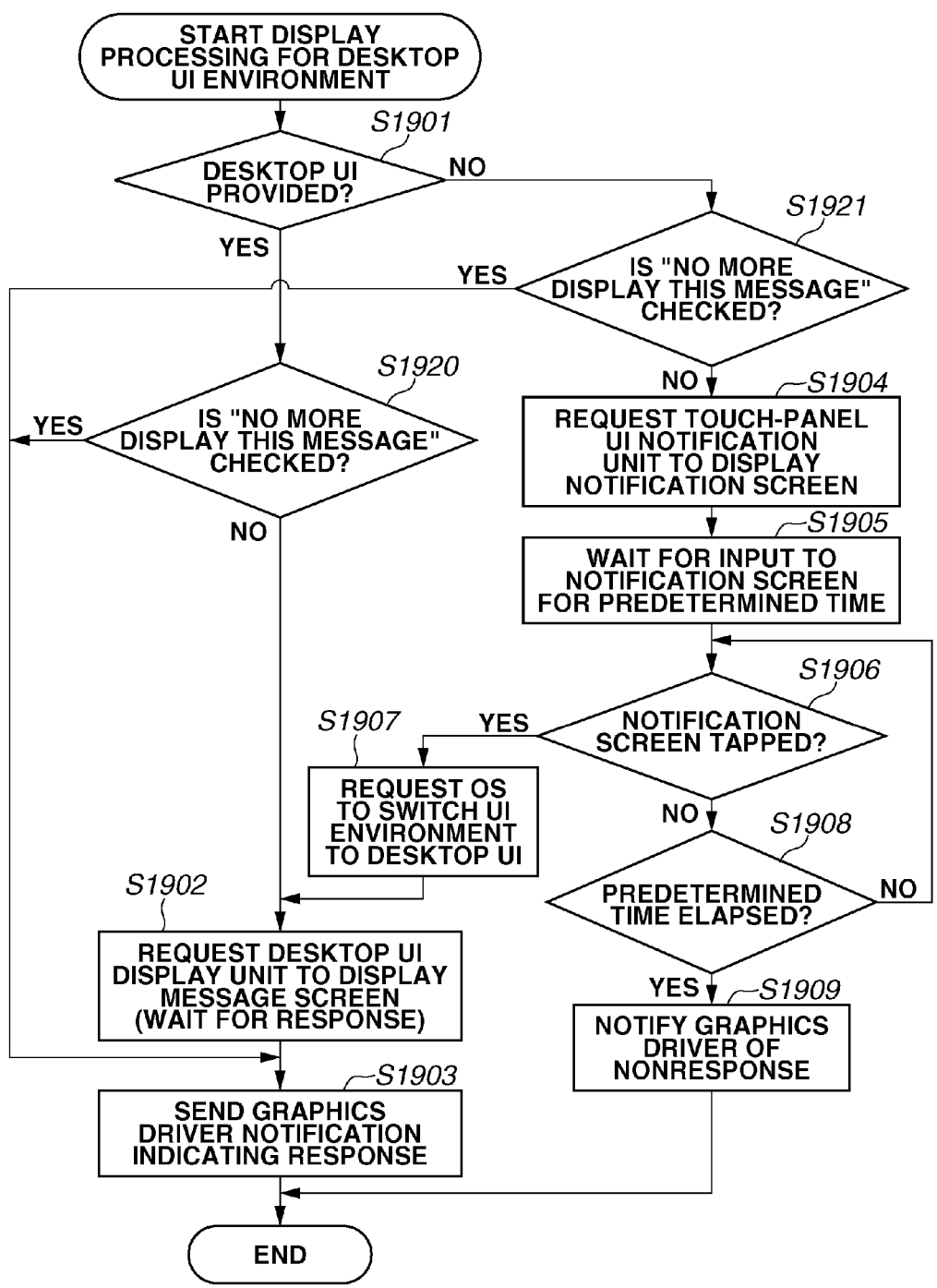
FIG. 19 illustrates processing for display control on a desktop UI environment according to a sixth exemplary embodiment.

FIG. 19 is a flowchart illustrating processing for display control of a message screen on the desktop UI environment 2110 according to the sixth exemplary embodiment. This processing includes processing for displaying a message screen on a UI environment under which an application used for issuing a print execution instruction operates. A case is described where a subject that executes the flowchart of FIG. 19 is the UI control unit 2114, which is one of modules of the OS 2000. However, the UI control unit 2114 is not a restrictive one, but the graphics driver 2202 may be the subject. The processing illustrated in FIG. 19 is executed in place of the processing described with reference to FIG. 9.

In each of steps S1920 and S1921, which are features of the present processing, a determination is made according to the above-mentioned information written in step S1705. Processing in steps S1901 to S1909 is similar to that in steps S901 to S909 illustrated in FIG. 9, and, therefore, the description thereof is not repeated here.

In step S1920, the UI control unit 2114 refers to the shared storage 1200 to determine whether there is present the information indicating that the checkbox 3303 for "no more display this message" is valid. If there is the information (YES in step S1920), the processing proceeds to step S1903. If there is not the information indicating that the checkbox 3303 for "no more display this message" is valid (NO in step S1920), the processing proceeds to step S1902, in which the UI control unit 2114 issues a display request for the message screen 3300.

In step S1921, the UI control unit 2114 refers to the shared storage 1200 to determine whether there is present the information indicating that the checkbox 4703 for "no more display this message" is valid. If there is the information (YES in step S1921), the processing proceeds to step S1903. If there is not the information indicating that the checkbox 4703 for "no more display this message" is valid (NO in step S1921), the processing proceeds to step S1904.

In a case where the processing proceeds to step S1903 after YES in step S1920 or YES in step S1921, the UI control unit 2114 issues, to the graphics driver 2202, a notification equivalent to the print start button being pressed by the user. This enables starting processing, including generation of print data by the graphics driver 2202, while dispensing with display of a message screen.

Figure 20:
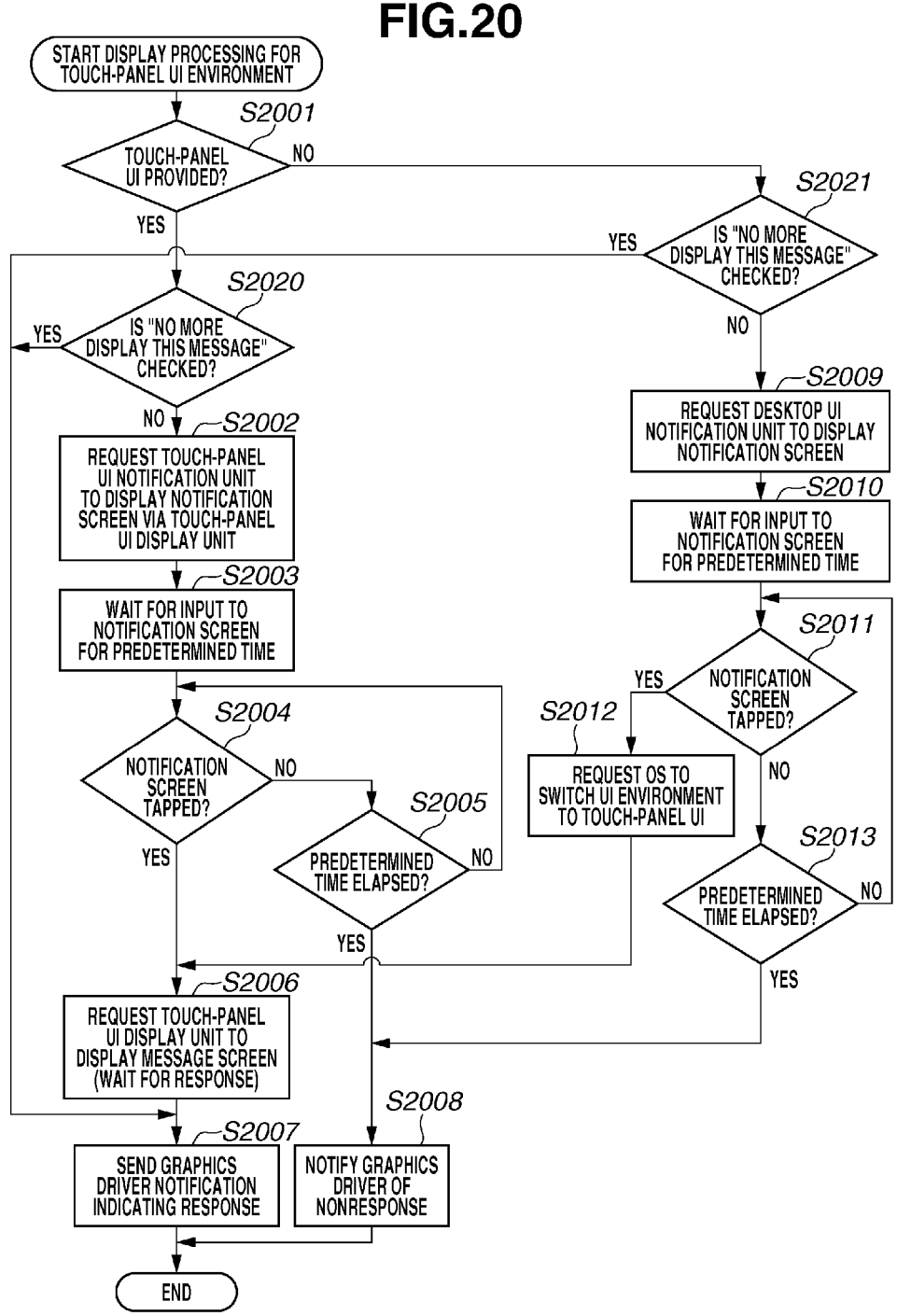
FIG. 20 illustrates processing for display control on a touch-panel UI environment according to the sixth exemplary embodiment.

FIG. 20 is a flowchart illustrating processing for display control of a message screen on the touch-panel UI environment 2120 according to the sixth exemplary embodiment. This processing includes processing for displaying a message screen on a UI environment under which an application used for issuing a print execution instruction operates. A case is described where a subject that executes the flowchart of FIG. 20 is the UI control unit 2114, which is one of modules of the OS 2000. However, the UI control unit 2114 is not a restrictive one, but the graphics driver 2202 may be the subject. The processing illustrated in FIG. 20 is executed in place of the processing described with reference to FIG. 10.

In each of steps S2020 and S2021, which are features of the present processing, a determination is made according to the above-mentioned information written in step S1705. Processing in steps S2001 to S2013 is similar to that in steps S1001 to S1013 illustrated in FIG. 10, and, therefore, the description thereof is not repeated here.

In step S2020, the UI control unit 2114 refers to the shared storage 1200 to determine whether there is present the information indicating that the checkbox 4703 for "no more display this message" is valid. If there is the information (YES in step S2020), the processing proceeds to step S2007. If there is not the information indicating that the checkbox 4703 for "no more display this message" is valid (NO in step S2020), the processing proceeds to step S2002.

In step S2021, the UI control unit 2114 refers to the shared storage 1200 to determine whether there is present the information indicating that the checkbox 3303 for "no more display this message" is valid. If there is the information (YES in step S2021), the processing proceeds to step S2007. If there is not the information indicating that the checkbox 3303 for "no more display this message" is valid (NO in step S2021), the processing proceeds to step S2009.

In a case where the processing proceeds to step S2007 after YES in step S2020 or YES in step S2021, the UI control unit 2114 issues, to the graphics driver 2202, a notification equivalent to the print start button being pressed by the user. This enables starting processing, including generation of print data by the graphics driver 2202, while dispensing with display of a message screen.

In the seventh exemplary embodiment, processing is described for performing display control of a message screen on a UI environment capable of displaying the message screen, in consideration of the check or uncheck of a checkbox for "no more display this message" in the message screen.

FIG. 21 is a flowchart illustrating processing for display control according to the seventh exemplary embodiment. A case is described where a subject that executes the flowchart of FIG. 21 is the UI control unit 2114, which is one of modules of the OS 2000. However, the UI control unit 2114 is not a restrictive one, but the graphics driver 2202 may be the subject. The processing illustrated in FIG. 21 is executed in place of the processing described with reference to FIG. 11. The present processing is similar to that described in FIG. 11, and, therefore, only different portions are described.

In step S2103, the UI control unit 2114 performs processing described in any one of the fifth and sixth exemplary embodiments. In step S2105, the UI control unit 2114 performs processing illustrated in FIG. 19. In step S2106, the UI control unit 2114 performs processing illustrated in FIG. 20.

As described above, according to the seventh exemplary embodiment, a message screen can be displayed on an appropriate UI environment in consideration of the capability of a display unit for each UI environment and the check or uncheck of a checkbox for "no more display this message" in the message screen.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-060271 filed Mar. 22, 2013, which is hereby incorporated by reference herein in its entirety.

What is claimed is:

1. An information processing apparatus capable of providing a first user interface (UI) environment and a second UI environment that is different from the first UI environment, the information processing apparatus comprising:
   a determination unit configured to determine a current UI environment, wherein a screen on the second UI environment is not displayed in a case where a screen on the first UI environment is displayed, and wherein a screen on the first UI environment is not displayed in a case where a screen on the second UI environment is displayed;
   a control unit configured to, in a case where a message screen is displayed to a user when a printing request is made to a printing device, control display processing of the message screen, wherein the message screen includes a message associated with a predetermined operation required for the printing device, and wherein the control unit transmits a first request for display processing to a first display control unit in the first UI environment in a case where the determination unit determines that the current UI environment is the first UI environment, and transmits a second request for display processing to a second display control unit in the second UI environment in a case where the determination unit determines that the current UI environment is the second UI environment;
   the determination unit determines that the current UI environment is the first UI environment, and then the control unit controls the display processing such that the message screen based on a printing request issued by a second program running on the second UI environment is displayed on the first UI environment, in a case where the printing request is issued by the second program and the second UI environment is changed to the first UI environment after the printing request is issued, wherein a balloon type screen is displayed as a notification screen provided by an operating system in the first UI environment;
   the determination unit determines that the current UI environment is the second UI environment, and then the control unit controls the display processing such that the message screen based on a printing request issued by a first program running on the first UI environment is displayed on the second UI environment, in a case where the printing request is issued by the first program and the first UI environment is changed to the second UI environment after the printing request is issued, wherein a toast type screen is displayed as a notification screen provided by an operating system in the second UI environment; and
   wherein the determination unit and the control unit are performed by a processor.

2. The information processing apparatus according to claim 1, wherein the message screen containing content associated with a predetermined operation required for the printing device contains display of at least one of a guide to the user for envelope printing, a guide explaining a procedure for setting a disc onto a printer during printing on a disc surface thereof, and a guide explaining a method for setting paper onto a cassette.

3. The information processing apparatus according to claim 1, wherein the message screen further includes a message screen for issuing a notification about content detected during a process of processing by a device driver compatible with the printing device.

4. The information processing apparatus according to claim 1, wherein a notification screen provided by an operating system that operates on the information processing apparatus is displayed according to the display processing by the control unit, and the message screen is displayed by a program that operates in any one of the first UI environment and the second UI environment, according to an input operation by the user on the notification screen.

5. A method for an information processing apparatus capable of providing a first user interface (UI) environment and a second UI environment that is different from the first UI environment, the method comprising:
   determining a current UI environment, wherein a screen on the second UI environment is not displayed in a case where a screen on the first UI environment is displayed, and wherein a screen on the first UI environment is not displayed in a case where a screen on the second UI environment is displayed;
   controlling, in a case where a message screen is displayed to a user when a printing request is made to a printing device, display processing of the message screen, wherein the message screen includes a message screen containing content associated with a predetermined operation required for the printing device, and wherein the control unit transmits a first request for display processing to a first display control unit in the first UI environment in a case where the determination unit determines that the current UI environment is the first UI environment, and transmits a second request for display processing to a second display control unit in the second UI environment in a case where the determination unit determines that the current UI environment is the second UI environment;
   determining that the current UI environment is the first UI environment, and then controlling the display processing such that the message screen based on a printing request issued by a second program running on the second UI environment is displayed on the first UI environment, in a case where the printing request is issued by the second program and the second UI environment is changed to the first UI environment after the printing request is issued, wherein a balloon type screen is displayed as a notification screen provided by an operating system in the first UI environment; and
   determining that the current UI environment is the second UI environment, and controlling the display processing such that the message screen based on a printing request issued by a first program running on the first UI environment is displayed on the second UI environment in a case where the printing request is issued by the first program and the first UI environment is changed to the second UI environment after the printing request is issued, wherein a toast type screen is displayed as a notification screen provided by the operating system in the second UI environment.

6. A non-transitory computer-readable storage medium storing a computer program that causes a computer to execute a method for an information processing apparatus capable of providing a first user interface (UI) environment and a second UI environment that is different from the first UI environment, the method comprising:

determining a current UI environment, wherein a screen on the second UI environment is not displayed in a case where a screen on the first UI environment is displayed, and wherein a screen on the first UI environment is not displayed in a case where a screen on the second UI environment is displayed;

controlling, in a case where a message screen is displayed to a user when a printing request is made to a printing device, display processing of the message screen, wherein the message screen includes a message screen containing content associated with a predetermined operation required for the peripheral printing device, and wherein the control unit transmits a first request for display processing to a first display control unit in the first UI environment in a case where the determination unit determines that the current UI environment is the first UI environment, and transmits a second request for display processing to a second display control unit in the second UI environment in a case where the determination unit determines that the current UI environment is the second UI environment;

determining that the current UI environment is the first UI environment, and then controlling the display processing such that the message screen based on a printing request issued by a second program running on the second UI environment is displayed on the first UI environment, in a case where the printing request is issued by the second program and the second UI environment is changed to the first UI environment after the printing request is issued, wherein a balloon type screen is displayed as a notification screen provided by an operating system in the first UI environment; and determining that the current UI environment is the second UI environment, and controlling the display processing such that the message screen based on a printing request issued by a first program running on the first UI environment is displayed on the second UI environment in a case where the printing request is issued by the first program and the first UI environment is changed to the second UI environment after the printing request is issued, wherein a toast type screen is displayed as a notification screen provided by the operating system is displayed in the second UI environment.

* * * * *